United States Patent [19]

Meiksin

[11] Patent Number: 4,652,857
[45] Date of Patent: Mar. 24, 1987

[54] METHOD AND APPARATUS FOR TRANSMITTING WIDE-BANDWIDTH FREQUENCY SIGNALS FROM MINES AND OTHER POWER RESTRICTED ENVIRONMENTS

[76] Inventor: Zvi H. Meiksin, 1900 Mulhatton St., Pittsburgh, Pa. 15217

[21] Appl. No.: 887,987

[22] Filed: Jul. 25, 1986

Related U.S. Application Data

[63] Continuation of Ser. No. 489,751, Apr. 29, 1983, abandoned, which is a continuation-in-part of Ser. No. 178,626, Aug. 15, 1980, abandoned.

[51] Int. Cl.$^4$ ............................................. H03M 1/00
[52] U.S. Cl. .................... 340/347 R; 340/347 AD; 340/347 DA; 340/347 M; 361/1; 375/6; 455/40; 455/41; 307/351
[58] Field of Search .................. 340/347 AD, 347 M; 455/38, 72, 70, 352, 355, 40, 41; 361/1, 2; 375/6; 307/351; 179/82

[56] References Cited

U.S. PATENT DOCUMENTS

| | | | |
|---|---|---|---|
| 3,073,896 | 1/1983 | James | 178/6 |
| 3,219,934 | 11/1965 | Kalfain | 328/15 |
| 3,349,184 | 10/1967 | Morgan | 179/15.5 |
| 3,437,760 | 4/1969 | Kawashima et al. | 179/15 |
| 3,466,392 | 9/1969 | Calfee et al. | 178/66 |
| 3,470,472 | 9/1969 | Suzuki et al. | 325/18 |
| 3,659,048 | 4/1972 | Zuerblis et al. | 178/66 A |
| 3,662,380 | 5/1972 | Cargile | 340/347 D |
| 3,740,488 | 6/1973 | Linfield et al. | 179/82 |
| 3,909,811 | 9/1975 | Adler | 340/189 |
| 3,936,610 | 2/1976 | Schiffman | 179/15.55 |
| 3,947,832 | 3/1976 | Rosgen et al. | 340/224 |
| 3,950,607 | 4/1976 | Southworth et al. | 178/6 |
| 3,958,235 | 5/1976 | Duffy | 340/336 |
| 3,967,201 | 6/1976 | Rorden | 328/28 |
| 4,053,931 | 10/1977 | Hawkins et al. | 358/134 |
| 4,087,781 | 5/1978 | Grossi et al. | 340/18 |
| 4,112,425 | 9/1978 | Zobrist et al. | 340/347 M X |
| 4,159,916 | 5/1979 | Poppelbaum | 364/602 |

FOREIGN PATENT DOCUMENTS

1501874  2/1978  United Kingdom ......... 340/347 SH

OTHER PUBLICATIONS

The Engineering Staff of Analog Devices, Inc., Analog-Digital Conversion Handbook, 6/1972, pp. II-40 to II-45.
Ryder, Electronic Fundamentals and Applications, Prentice-Hall, Inc., 1950, pp. 483-485; 503-519.
Meiksin and Thackray, Electronic Design with Off-the-Shelf Integrated Circuits, pp. 170-172 (Parker Publishing Co. 1980).
The Engineering Staff of Analog Devices, Inc., Analog-Digital Conversion Handbook, 6/1972, pp. I-70 to I-75; I-84 to I-87.
General Instrument Corp., Development and Prototype Production of a Trapped Miner Signalling Transmitter/-Transceiver, Jun. 1981, NTIS Report No. PB82-244260.

Primary Examiner—T. J. Sloyan
Attorney, Agent, or Firm—Samuel Shipkovitz; Ronald R. Snider

[57] ABSTRACT

A method and apparatus for transmitting and receiving messages by electromagnetic induction in a power restricted environment is disclosed in which the message bandwidth is narrowed prior to transmission and restored to its original breadth upon reception. This is accomplished by imputting a signal of a given duration into a signal storage means and outputting the signal from the storage means over a longer duration. The signal must be converted into a form suitable for storage. In a first preferred embodiment this is accomplished by converting the message to a digital form inputting it into a signal storage means, retrieving the message from storage at a rate different from the input rate and converting the retrived message to analog form. In a second preferred embodiment the signal is differentiated, and converted into a square wave; the zero crossings are identified and stored. The method and apparatus here disclosed permit transmission of a message with a minimum power input and thus are particularly useful in mines and other power restricted areas.

24 Claims, 16 Drawing Figures

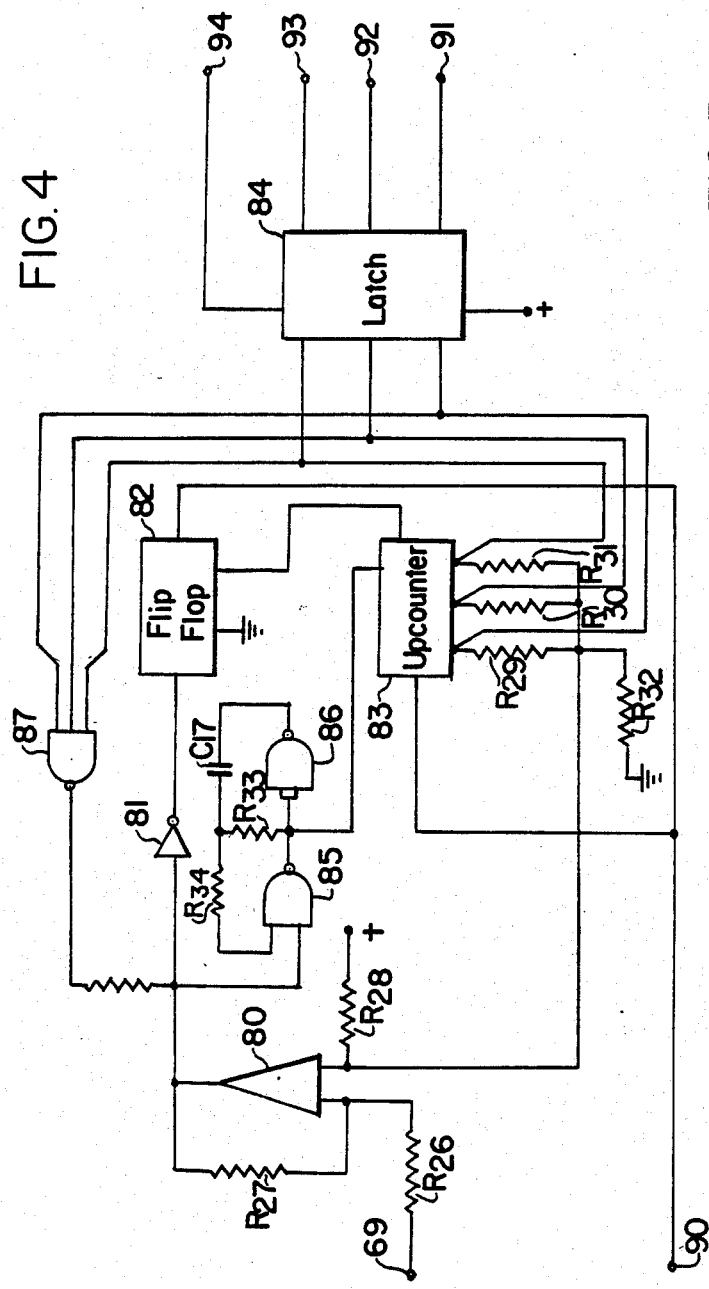
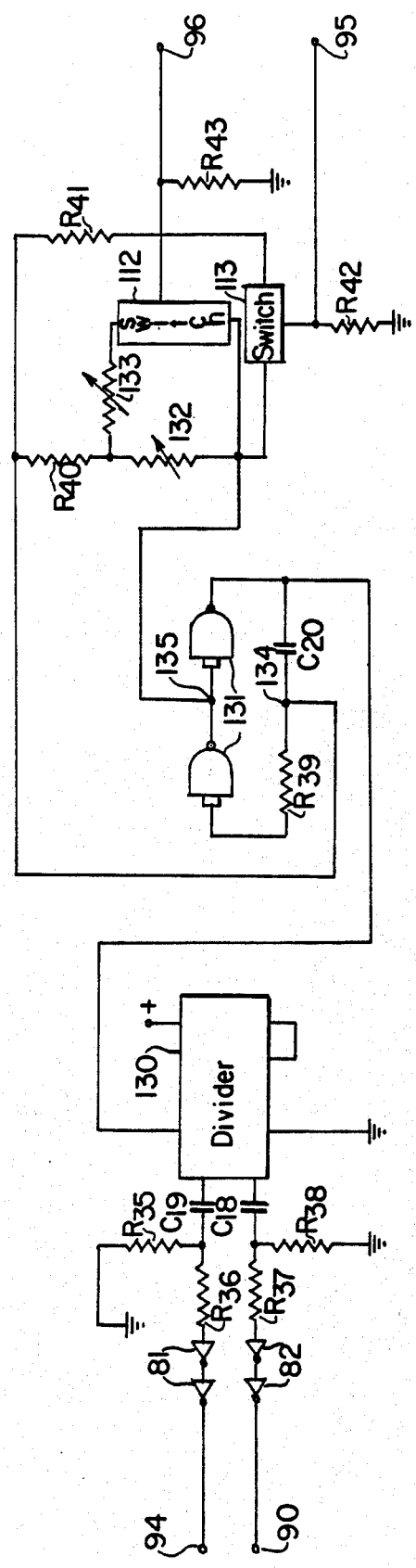
FIG.4
FIG.5

METHOD AND APPARATUS FOR TRANSMITTING WIDE-BANDWIDTH FREQUENCY SIGNALS FROM MINES AND OTHER POWER RESTRICTED ENVIRONMENTS

This is a continuation of application Ser. No. 489,751, filed 04/29/83, abandoned, which in turn is a continuation-in-part of Ser. No. 178,626, filed 08/15/80 abandoned.

NATURE OF THE INVENTION

This invention relates to a method and apparatus for processing spoken messages and other wide-bandwidth signals so that they can be transmitted with low power input. The apparatus is particularly useful for transmitting signals from locations where available or permissible transmission power is limited such as through the earth and from mines and caves.

THE PRIOR ART

There is a limit to the amount of power that can be safely used in a mine. Hazardous conditions, such as the presence of flamable gases, limit the amount of energy that may be stored in the transmitting antenna. For this reason only very low power equipment can be safely used in mines. Low power transmitters are capable of sending tones or signals having narrow bandwidths. Spoken messages and most of the messages being commercially transmitted through the atmosphere have bandwidths which are too wide to be carried by low power transmitters.

Miners have long wanted to be able to engage in voice communications in the mine and with those outside the mine. However, prior to my invention the art offered no transmitter or receiver which could operate within the safe power limits of a mine and transmit spoken messages. Thus, the only transmitters in use in the mines are low power units which send and receive a single tone.

Signal transmission through the earth imposes other problems not associated with the presence of hazardous gases. An electromagnetic field having a frequency in excess of 3000 Hz may not be coupled through the earth. Such frequencies are so severely attenuated that transmission from a mine or cave is impractical. Ground water and bodies of water impose similar frequency limitations.

One must also consider the effects of power distribution lines and machinery which may be present in or near the mine. High electric noise levels at 60 Hz will be caused by power lines and machinery. Machinery also causes harmonics up to about 420 Hz.

SUMMARY OF THE INVENTION

The principal object of the invention is to provide a method and apparatus which enables one to transmit spoken messages and other wide-bandwidth signals using limited power and without loss of signal quality.

The apparatus of the present invention permits transmissions with a minimum power input. It will function properly with any voltage. Yet for voltage sources of less than 5 volts I prefer to provide a voltage set-up circuit regulator to increase the voltage to 5 volts. I also prefer to use a 4 volt battery as the power source because it is the standard size battery used in mines. Since my device has such a low power requirement, it can safely be used in mines and other power restricted areas.

In the transmitting mode the apparatus slows the signal down and transmits it over a time interval longer than the original length of the message. In the receiving mode the apparatus receives the slow incoming signal and transforms it to the original length before the signal is applied to the speaker. I prefer to lengthen the signal by a factor of ten times the original length of the signal.

Although the apparatus is particularly useful in conjunction with microphones and speakers, it can be used with other types of equipment which produce or receive signals.

It is well known that it is not possible to transmit a signal by propagation through the earth because the high frequencies are severely attenuated. In my invention, the signal from the transmitter(s) is coupled to the receiver by electromagnetic induction (Faraday induction). The current (modulated) in the transmitter antenna produces magnetic flux. The magnetic flux links the receiver antenna, inducing current in the receiver antenna which is later demodulated in the receiver.

A present preferred embodiment of the invention is comprised of an analog-digital converter, memory and digital-analog converter connected in series. Amplifiers are preferably provided at each end of the circuit to which a microphone or receiver and speaker or transmitter are attached. Additionally, I prefer to provide an amplitude limiter and band-pass filter for the incoming signal and a filter on the output end of the transmitter.

A second preferred embodiment utilizes a high pass filter, amplifier and peak clipper, memory and modulator in the transmitter. The receiver has a demodulator, memory, low pass filter and amplifier. In this system the signal is differentiated, amplified and clipped to form a square wave. The wave's zero crossings are recorded in memory. The zero crossings are read from a memory at a slower rate and used to modulate a carrier signal. A single side band of the carrier signal is transmitted to the receiver where the original signal is reconstructed by reversing the signal transformation performed by the transmitter.

I prefer to construct a single apparatus capable of transmitting or receiving signals wherein the components common to the transmitter and receiver are used for both the transmission and receiving modes. However, the invention can be embodied in two units one having only transmitting capabilities and the other being solely a receiver.

Other details, objects and advantages of the invention will become apparent as the following description of several present preferred embodiments of the invention proceeds.

BRIEF DESCRIPTION OF THE DRAWINGS

In the accompanying drawings I have shown certain preferred embodiments of the invention in which:

FIG. 4 is a circuit diagram for the analog-digital converter;

FIGS. 5 thru 7 are circuit diagrams for the memory unit;

DESCRIPTION OF THE PREFERRED EMBODIMENTS

Figure 1:
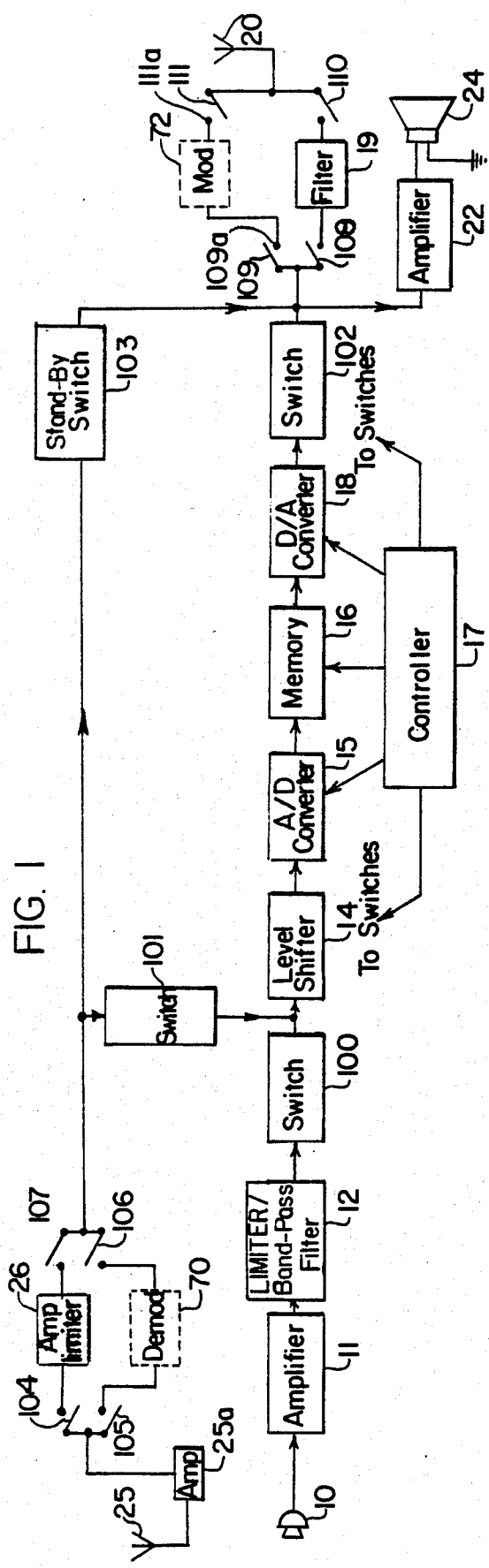
FIG. 1 is a block diagram of a preferred embodiment of my invention capable of operating in a transmission mode, receiving mode or standby mode.

Referring to FIG. 1, for transmission a microphone 10 is connected to an amplifier 11 and amplitude limiter unit 12 having a band pass filter which is wired through switch 100 to amplifier, filter & level shifter 4 and an analog-digital converter 15. The amplifier, filter and level shifter 14 shifts the positive and negative wave signal to make it all positive. A memory unit 16 is connected between the analog-digital converter 15 and a digital-analog converter 18 which also contains a band pass filter. The converter and filter unit 18 is connected to a transmitter 20 through switch 102. The signal goes to the transmitter or antenna 20 through filter 19 or optional modulator 72. Switches 108, 109, 110 and 111 are provided to direct the signal to the modulator or filter. If desired an amplifier may also be used to amplify the signal from the digital-analog converter 18 to the transmitter 20. A controller 17 is provided for the switches, converters and memory. I prefer to connect an amplifier 22 and speaker 24 through switch 102 to the digital-analog converter 18 to provide an audible verification that the message is being transmitted.

For reception an antenna 25 preferably having an amplifier 25a receives and amplifies the signal. The receiver is connected through an amplitude limiter 26 or optional demodulator 70 and switch 101 to level shifter 14 and the converters, memory unit and speaker. Switches 104, 105, 106 and 107 are provided to direct the signal to either the amplitude limiter 26 or the demodulator 70. I also prefer to create a standby mode by connecting the antenna 25 to a speaker 24 through switch 103. When switch 103 is closed the operator will hear an audible signal whenever reception occurs, and he can switch the transceiver to the "receive" mode. The receiver is turned on automatically by a synch signal, when the modulator and demodulator are used.

I have developed unique circuits which I prefer to use for my apparatus. However, it should be distinctly understood that other functionally equivalent circuits including microprocessors and magnetic memories, delay lines, or magnetic tape memories and electrical means could be constructed by those skilled in the art and used in my invention to change the rate of entering into and outputing from the memories. Present preferred circuits are shown in FIGS. 2 thru 12 and will be discussed following an explanation of the operation of the embodiment of the invention shown in FIG. 1.

My method and apparatus for transmitting and receiving a spoken message and other signals of comparable or higher frequencies convert the message to an electric signal and reduce the frequency spectrum of the message to a lower frequency, for example 2 KHz, by means of discrete sampling or other filtering means, which is comparable in quality to telephone messages. The signal in the low frequency range from zero to, say, 500 Hz is filtered out to eliminate the electrical noise. This leaves a message of 1500 Hz bandwidth between 500 Hz and 2000 Hz. This is still too broad a bandwidth to transmit with the limited power available or permissible. I store the message in a memory. The message is then read out from memory at a lower rate, preferably lower by a factor of ten. This results in a frequency band of 150 Hz between 50 and 200 Hz. This signal can be transmitted with the reduced available or safely permissible power. To eliminate the effect of the aforementioned low frequency noise, the message (150 Hz in my example) is preferably modulated on a carrier frequency, for example of 2000 Hz, by means of a balanced modulator which suppresses the carrier frequency, and results in a lower sideband frequency between 1800 Hz and 1950 Hz, and an upper sideband frequency between 2050 Hz and 2200 Hz. Only one sideband is transmitted. Thus, only a bandwidth of 150 Hz between 2050 Hz and 2200 Hz is transmitted which is the best range for transmission through the lithosphere. As stated above, transmission and reception in my invention occurs by electromagnetic induction. At the receiving end, the signal is demodulated, entered into memory and read out at a higher rate, amplified and applied to a speaker resulting in a reproduction of the original spoken message. Wide frequency signals up to a bandwidth of 20 k Hz would be practical in accordance with this invention. The result is that a message of frequency bandwidth of 1500 Hz was transmitted with power needed to transmit a message of bandwidth of 150 Hz, while achieving at the receiving end a signal to noise ratio quality as though the message were transmitted with power required to transmit a message of 1500 Hz bandwidth with the same signal to noise ratio. The signal was processed so the low frequency noise is eliminated and transmission is carried out in a frequency band best suitable for transmission by electromagnetic induction through the lithosphere.

OPERATION OF THE FIRST PREFERRED EMBODIMENT

Referring to FIG. 1 and considering the transmitting mode, the audio signal from a signal input means such as a microphone 10 is amplified by amplifier 11. Switch 101 is open because the receiver 25 is not now in use. The signal passes to an amplitude limiter which reduces distortion and then goes through a band-pass filter in the amplitude limiter unit 12. I prefer to use a 500–2000 Hz band-pass filter, here. The filtered signal passes through switch 100 which is closed, through level shifter 14 and into the analog-digital converter 15 where it is sampled, quantized into eight levels and converted to binary digits. While I show the level shifter 14 and converter 15 as separate units one can substitute a converter having an integrated shifter, or one could rectify the signal before sending it to the converter. I have found that a sampling rate of 5500 samples per second works very well. The binary digits are fed into the memory unit 16 where they are stored and then read out at a slower rate. I prefer that the rate be one-tenth the sampling rate or 550 values per second for a sampling rate of 5500 samples per second. The slow digital signal from the memory 16 is converted to an analog signal by the digital-analog converter 18, passed to the transmitter 20 either through a low-pass filter 19 of preferably 200 Hz, or through a modulator 72 via closed switch 102. Switches 108, 109, 110 and 111 control the flow of the signal to either the modulator or the filter. The output may also be fed to a speaker amplifier 22 and speaker 24 to provide an audible verification that the message is being transmitted.

When operating in the receiving mode the incoming signal comes from the antenna with optional amplifier 25a rather than the microphone 10. It passes through an amplitude limiter 26 or demodulator 70 as determined by switches 104, 105, 106 and 107. The signal continues through closed switch 101 to level shifter 14 because switch 100 is open. The signal then passes to the analog-digital converter 15 where it is sampled, quantized into eight levels and converted into binary digits. The sampling rate should be equal to the signal feed rate from the memory to the converter in the transmitter which generated the signal preferable 550 samples per second. After being sampled and converted into binary digits the signal passes into memory 16 where it is stored. Then it is fed out of the memory at a faster rate than it entered the memory. The output rate should be ten times the input rate or 5500 values per second for an input rate of 550 samples per second. The signal coming from the memory 16 is converted to an analog signal and filtered in the digital-analog converter unit 18, passed through closed switch 102, amplified and filtered in amplifier 22 and applied to signal output means such as a speaker 24. Switch 103 will be closed and switches 108 and 109 are open.

The apparatus can also be operated in a standby mode in which switches 103, 104 and 107 or 103, 105 and 106 are closed and the other switches are open providing a direct connection between the receiver and the speaker 24. When the apparatus is connected in this manner the operator will hear an audible signal whenever reception occurs.

The size of the required memory for this system depends upon the length of the message to be processed, the selected sampling rate and the number of quantization levels used. These factors are related according to the following formula:

$$\text{\# Memory bits} = \text{Sampling Rate} \times \text{Message Length} \times \frac{\log(\text{\# levels})}{0.301}$$

Hence, for a fixed memory and a fixed number of quantization levels, the sampling rate times the message length is constant.

The transmitter mode and receiving mode must have the same sampling settings between the memory and converters because these settings control the length of the message transmitted and received. Therefore, I prefer to provide for an automatic and fixed setting of these values in the apparatus.

In a preferred embodiment of the invention I provide a 73,728 bit memory and quantize into eight levels. For this unit the sampling rate times the message length is a constant value of 24,576. With a sampling rate of 5500 values per second the unit will process a message having a maximum length of 4.47 seconds. To change the length of the message that can be processed one can adjust the sampling rate. There are, of course, limits on this adjustment because the higher the sampling rate the more legible the message. This unit has performed satisfactorily with sampling rates of 4096 values per second for a 6 second message, 4915 values per second for 5 second message, and 7022 values per second for a 3.5 second message.

Several optional features can be added to the apparatus, first a timer unit can be provided to tell the user how much time he has to complete his message. Rather than use a clock-type timer I prefer to use a light string wherein the lights go on at predetermined intervals. Similarly, I also prefer to provide lights to tell the operator when the transmitter is able to accept messages for transmission, i.e., not in use, when a message is being transmitted, and when the receiver is able to receive messages.

I also prefer to provide an abort or reset switch to enable the system to quickly cycle through whatever message is in the system. This allows the operator to stop an incorrect message before transmission should he misspeak or discover an error during the input stage.

THE PRESENT PREFERRED CIRCUITRY

The present preferred circuitry of the first preferred embodiment of the invention is shown in FIGS. 2 thru 13. In these circuits I prefer to use the components listed in the following table and identified in the circuit diagrams.

| DESIGNATION | FUNCTION | SOURCE |
|---|---|---|
| 1N485 | Power Diode | Texas Instruments |
| 1N914 | Signal Diode | Texas Instruments |
| LM224 | Operational Amplifier | Texas Instruments |
| LM239 | Comparator | National Semiconductor |
| CD4000 | Dual 3-input NOR Gate plus Inverter | National Semiconductor |
| CD 4011 BE | Quad two-input NAND | National Semiconductor |
| CD 4012 | Dual four-input NAND | National Semiconductor |
| CD 4013 | Dual Flipflop | National Semiconductor |
| CD 4016 | Quad Bilateral Switch | National Semiconductor |
| CD 4017 | Decade Counter/Divider/Decoder | National Semiconductor |
| CD 4018 | Binary Counter | National Semiconductor |
| CD 4019 | Quad AND,OR | National Semiconductor |
| CD 4040 | Binary Counter | National Semiconductor |
| CD 4042 | Quad Latch | National Semiconductor |
| CD 4048 | Eight-function, Eight input gate | National Semiconductor |
| CD 4049 | Hex Inverter | National Semiconductor |
| CD 4518 | Dual Upcounter | National Semiconductor |
| HM6508 | Static RAM memory | Harris Semiconductor |
| UA78540 | Switching Power Supply | Fairchild |
| LM386 | Audio Power Amplifier | National Semiconductor |
| 1N914* | Signal Diode | Texas Instruments |
| LM224* | Operational Amplifier | National Semiconductor |
| LM 239* | Comparator | National Semiconductor |
| CD 4016* | Quad Bilateral Switch | National Semiconductor |
| CD 4040* | Binary Counter | National Semiconductor |
| CD 4049* | Hex Inverter | National Semiconductor |

*used in optional modulator and demodulator units.

Figure 2:
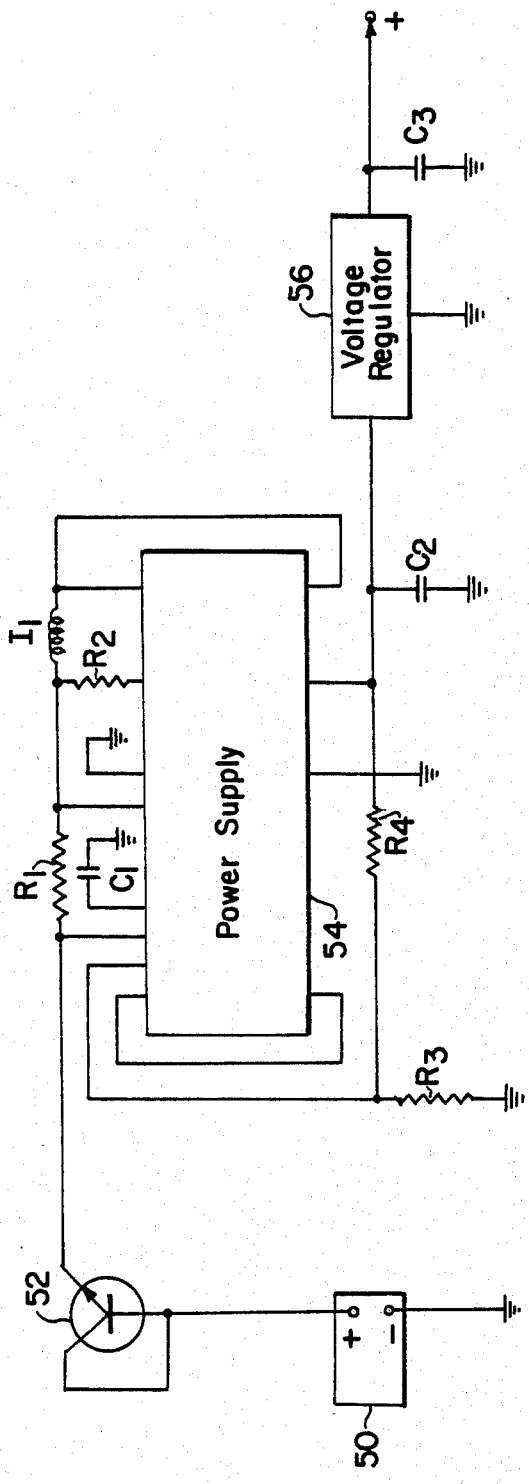
FIG. 2 is a circuit diagram of a preferred power supply circuit for the apparatus of this invention.

The power supply circuit shown in FIG. 2 is designed to provide a five volt voltage from a four volt battery, the common size used by miners. Referring to the drawing the 4 volt battery 50 is connected to an NPN germanium transistor 52, configured as a diode for protection against reverse polarity connection. The transistor is wired to a switching step-up power supply chip 54 in conjunction with resistances $R_1$, $R_2$, $R_3$, and $R_4$, inductor $I_1$ and capacitors $C_1$ and $C_2$. The stepped up signal from the chip 54 then passes through a voltage regulator 56 to the circuits. Although I prefer to use the voltage supply circuit shown in FIG. 2 to step-up the voltage, there are numerous other ways known to those skilled in the art in which this voltage increase can be accomplished. I prefer this circuit because it is relatively inexpensive and easy to construct.

Figure 3:
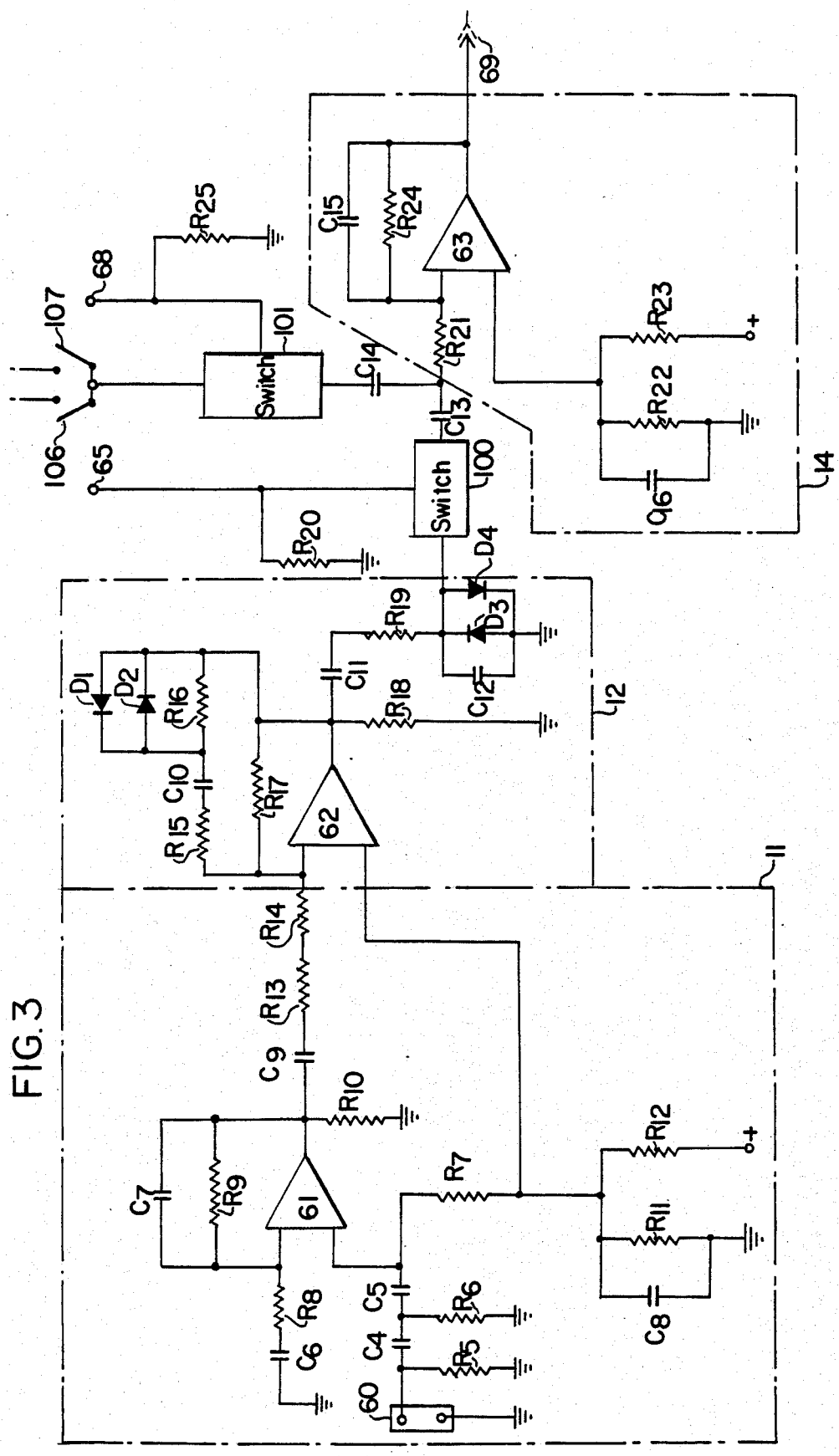
FIG. 3 is a circuit diagram showing the microphone, and amplifier amplitude limiter and band pass filter.
Figure 6:
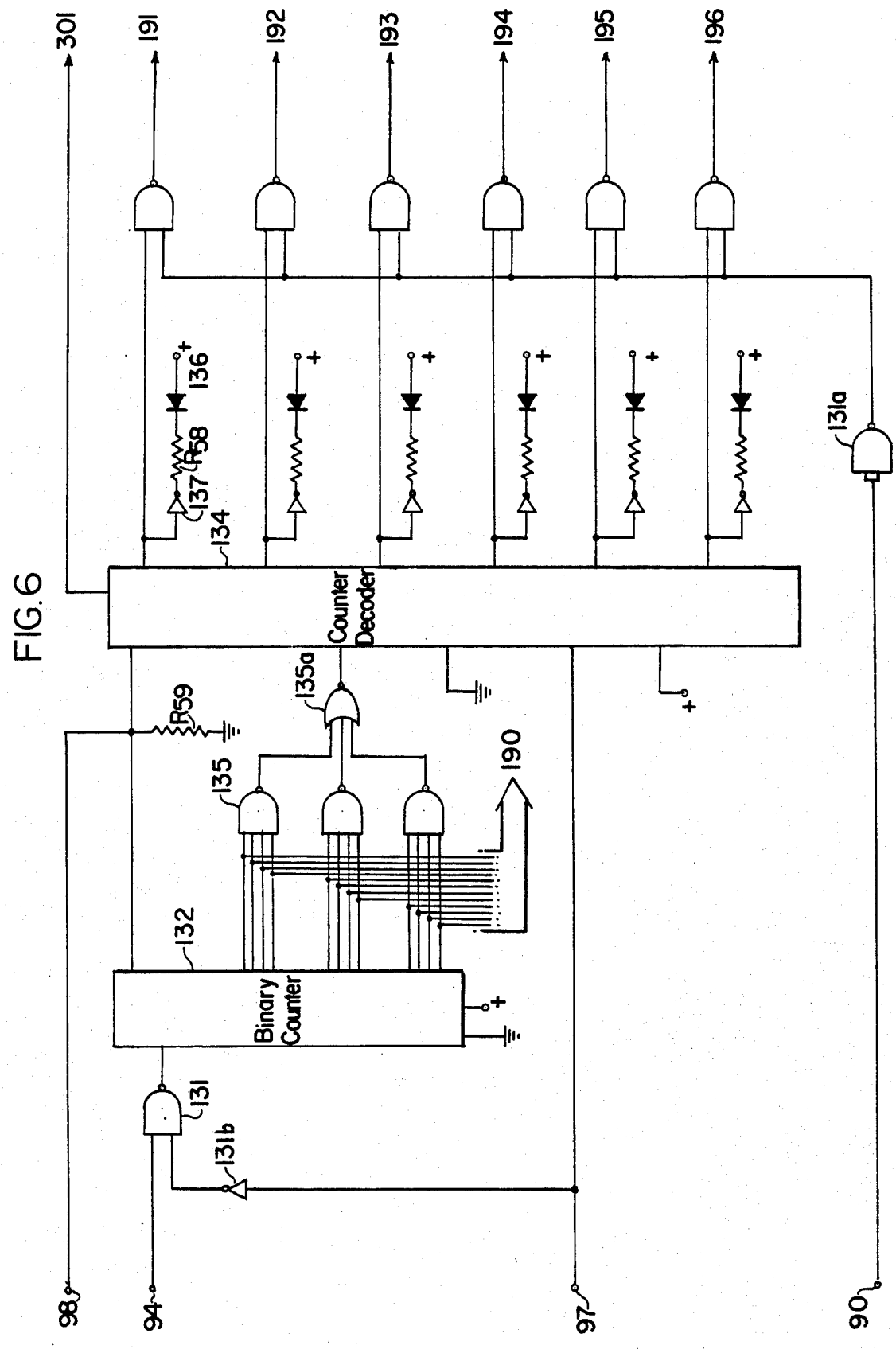

I prefer to provide a 3-stage amplifier, filter and amplitude limiter as diagramed in FIG. 3. A microphone 60 generates the input signal. The input signal is filtered through components $R_5$, $R_6$, $R_7$, $C_4$ and $C_5$ and applied to operational amplifier 61 where it is amplified and further filtered by the network of components $R_8$, $R_9$, $R_{10}$, $C_6$ and $C_7$. Components $C_8$, $R_{11}$, and $R_{12}$ bias amplifier 61 and amplifier 62. The signal is coupled to amplifier 62 through components $C_9$, $R_{13}$, and $R_{14}$. Additional amplification and filtering is achieved by amp 62 in conjunction with the peripheral components $R_{15}$, $R_{16}$, $R_{17}$, $R_{18}$, $R_{19}$, $C_{10}$, $C_{11}$, and $C_{12}$. The amplitude is limited and shaped by diodes $D_1$, $D_2$, $D_3$ and $D_4$. The signal is coupled to the third stage amplifier 63 through switch 100 with associated resistor $R_{20}$. The switch is controlled by means of a signal from the control circuit (FIG. 6) through point 65. Operational amplifier 63 is biased by components $R_{22}$, $R_{23}$ and $C_{16}$ and amplifies and filters the signal further in conjunction with peripheral components $R_{21}$, $R_{24}$, $C_{13}$ and $C_{15}$. The output signal is applied to the analog-digital converter (FIG. 4) through switch 100 attached to the controller at point 69. Switch 100 is closed in the transmitting mode and opened in the receiving mode. Switch 101 with associated resistor $R_{25}$ is also controlled through connection 68 by means of a signal from the control circuit (FIG. 6). It is closed in the receiving mode and opened in the transmitting mode. Switches 106 and 107 connect switch 101 to the demodulator 70 or amplitude limiter 26 through switches 107 and 108 (see FIG. 1). Boxes 11, 12 and 14 indicate the portions of the circuit shown in FIG. 3 which correspond to the amplifier and level shifter boxes of FIG. 1.

I prefer to use a comparator type analog digital converter which is diagramed in FIG. 4. The analog signal is applied at point 69 to comparator 80 with the associated resistors $R_{26}$, $R_{27}$ and $R_{28}$. During the comparison interval, the upcounter 83 starts counting from zero upwards. The digital output from 83 is converted to an analog signal through resistors $R_{29}$ thru $R_{32}$. This analog signal is compared with the input signal. If it is less than the input signal, the upcounter 83 keeps counting. When the digital-to-analog converted output just exceeds the analog input signal, the output of comparator 80 goes to "0". The signal is applied to the oscillator composed of NAND gates 85 and 86, capacitor $C_{17}$ and resistors $R_{33}$ and $R_{34}$ and through inverter 81 to flip-flop 82. The outputs from the oscillator (clock) and flip-flop 82 are applied to counter 83 and the count stops. The count is latched by latch 84 and is transferred to memory (FIG. 5) through terminals 91, 91 and 93 upon a clock signal coming from the memory cycle rate control (FIG. 3) applied to the clock terminal 91 of latch 84. The counter is also stopped through NAND 87 when the output reaches its maximum value, binary 111. Counter 83 and flip-flop 82 are reset by a reset signal coming from the memory cycle rate control (FIG. 5), through terminal 90.

The memory cycle rate control circuit is shown in FIG. 5. NAND circuits 131, potentiometers 132 and 133, switches 112 and 113, $R_{24}$, $R_{40}$ and $C_{20}$ constitute well known CMOS gates oscillator (see for example: Meiksin and Thackray: *Electronic Design with Off-the-Shelf Integrated Circuits*, Parker Publishing Company 1980). The frequency of oscillation is determined by capacitor $C_{20}$ and the resistance $R_{39}$ between terminals 134 and 135. The oscillator receives signals from the memory through terminal 96 and from the control circuit (FIG. 8) through terminal 95. When a logic "0" is applied at resistor $R_{43}$, then switch 112 is opened and the resistance between 134 and 135 is that of the sum of resistance $R_{40}$ and potentiometer 133 giving a low frequency of oscillations. When a logic "1" is applied at resistor $R_{43}$, switch 112 is closed putting potentiometer 132 in parallel with potentiometer 133 giving a high frequency of oscillation. When a logic "1" is applied at resistor $R_{42}$, switch 113 is closed and resistance $R_{41}$ shunts components $R_{40}$, 132, 133 and 112 giving a very high frequency of oscillation. The output of the oscillation is applied to divider 130 reducing the frequency by a factor of ten. Two reduced frequency signals are applied to the analog digital converter through $R_{35}$, $R_{36}$, $C_{19}$, inverter 81 and terminal 94 and to the memory through components $R_{37}$, $R_{38}$, $C_{18}$, inverter 82 and terminal 90. The two signals are one reduced clock period apart.

The memory address and enable circuit is diagramed in FIG. 6. Signals enter the circuit from the analog-digital converter at point 90 through NAND 131a and point 94. From point 94 the signal enters NAND circuit 131 and travels to a binary counter 132. Three dual four-input NAND circuits 135 and a NOR 135a connect the binary counter 132 to the counter decoder 134. A series of LEDs 136 are wired to the counter decoder 134 through hex inverters 137 and resistors $R_{58}$. The LEDs 136 will light in sequence at time intervals equal to one-sixth of the total time length of the maximum message the unit can handle thereby serving as a timing mechanism. The counter decoder 134 is also connected to the memory chips at points 191 through 196 via two-input NAND circuits 131. Finally, the counter decoder 134 is connected to the modulator or speaker at connection 301. After the cycle is completed an output from decoder 134 initiates a new count through inverter 131b. This signal is also transmitted to control circuit (FIG. 8) and the speaker amplifier (FIG. 9) through terminal 97.

Figure 7:
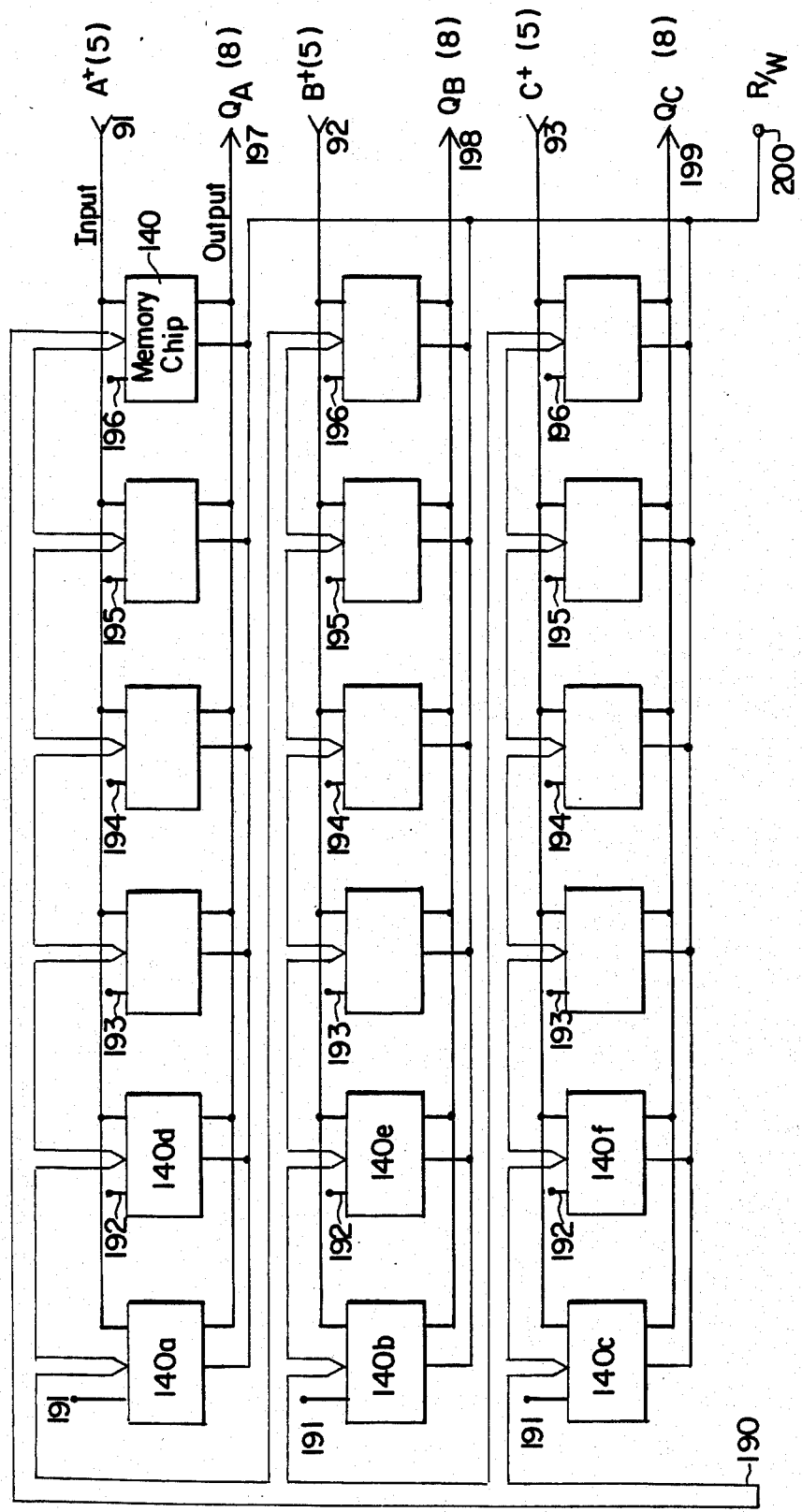
Figure 10:
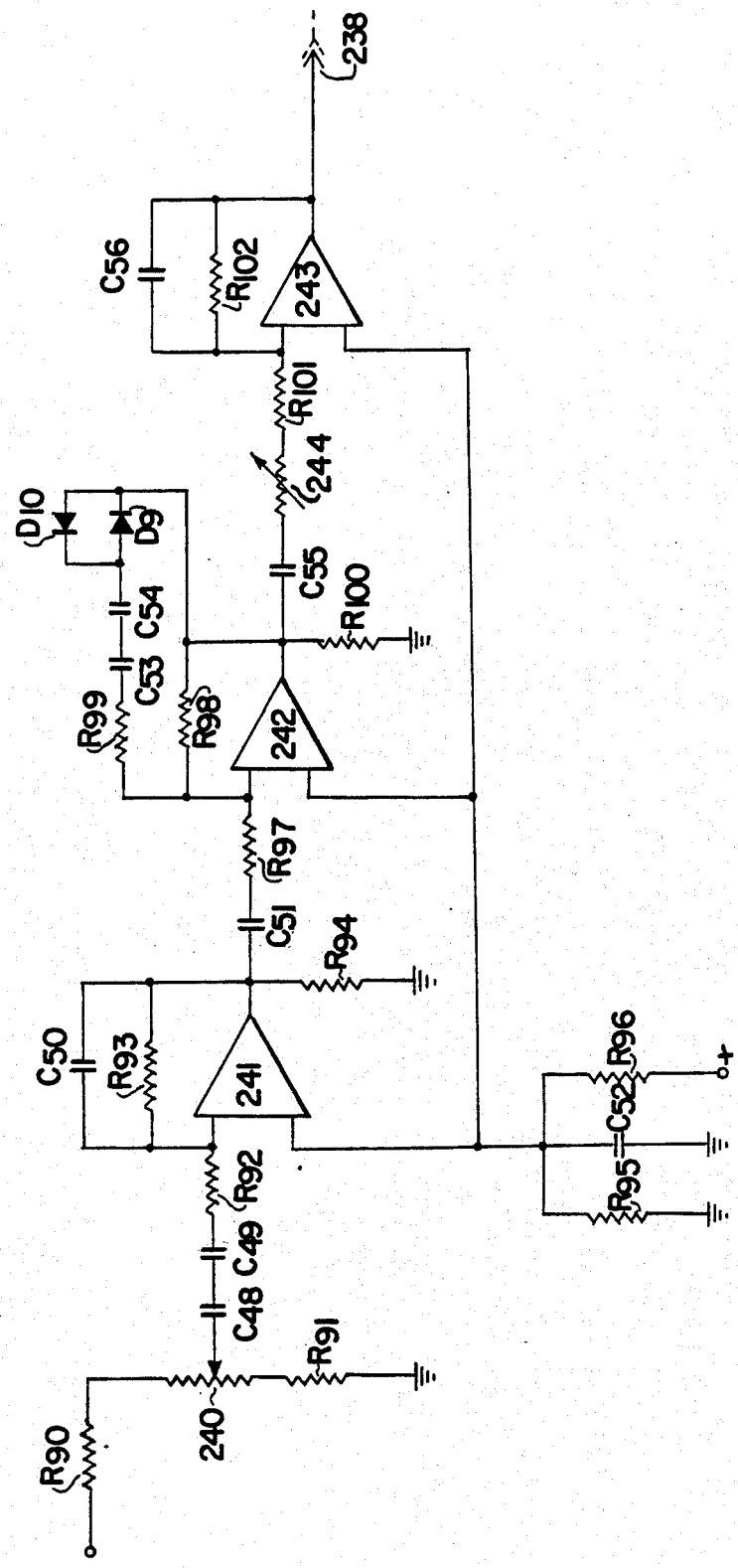
FIG. 10 is a circuit diagram for the receiver limiter amplifier.

The memory is comprised of a series of memory chips 140 arranged in groups of three to give a 24K by 3 bit memory as shown in FIG. 7. While I prefer to use semiconductor memory chips, magnetic bubble memories may also be used. The chips are connected to the memory address and enable circuits at points 191 through 196. They are also wired to the analog-digital converter through points 91, 92 and 93, to the digital-analog converter through points 197, 198 and 199. Memories 140a, 140b, 140c form one group, memories 140d, 140e, 140f form a second group, and so on. The memory is addressed through bundle 190 and enabled through terminals 191–196 with signals coming from the memory address and enable circuit (FIG. 6). The data A*, B* and C* are entered from the analog digital converter (FIG. 4) through terminals 91, 92 and 93. The memory outputs data $Q$A, $Q$B, $Q$C through terminals 197, 198 and 199 to the digital analog converter (FIG. 10). The memory reads information when R/W is logic "1" and it writes information when R/W is logic "0" as determined by the control circuit (FIG. 8) which connects to the memory at terminal 200.

Figure 8:
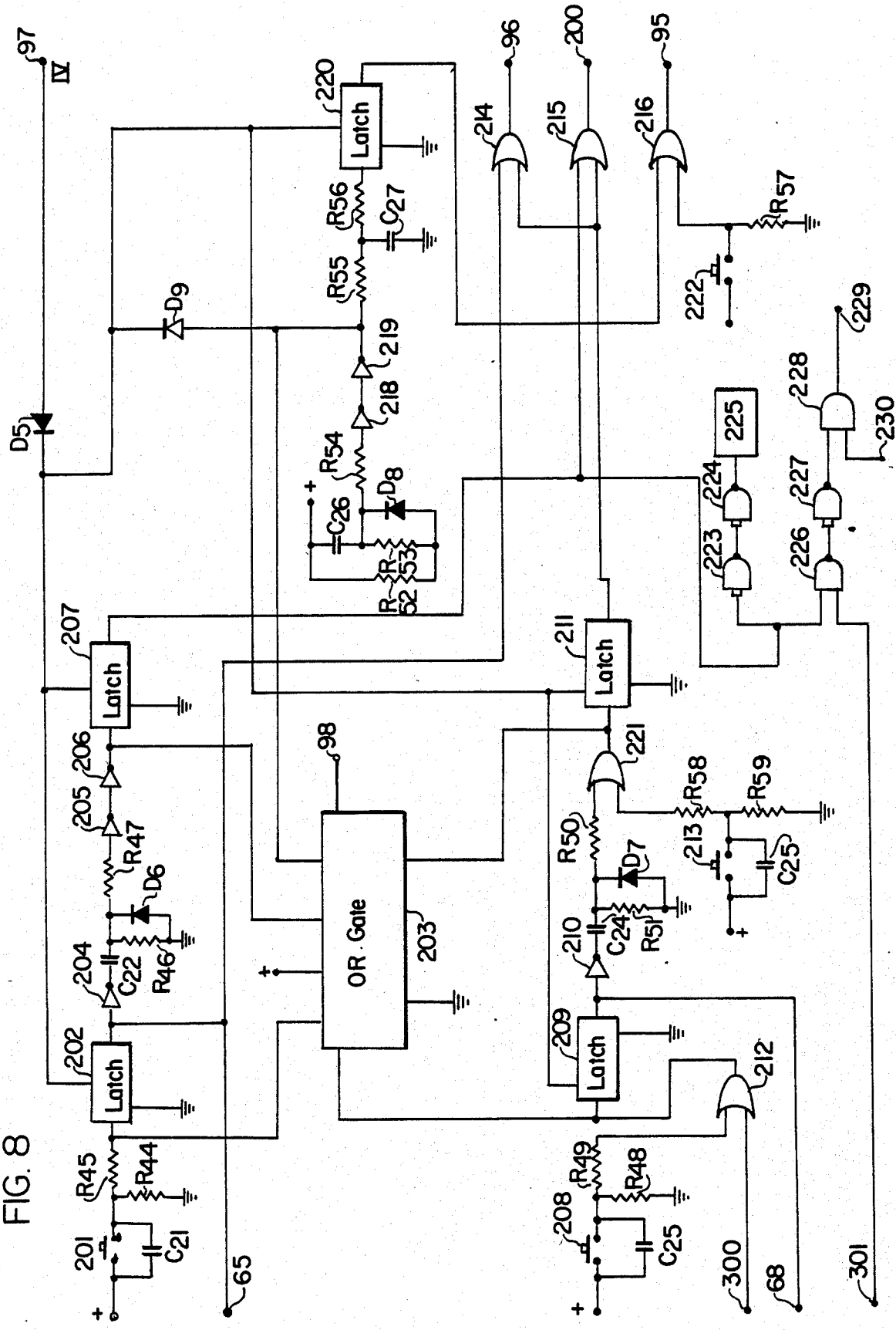
FIG. 8 is a circuit diagram of the control circuit.

The control circuit is shown in FIG. 8. To transmit a signal switch 201 is momentarily closed. This applies to a logic "1" through resistors $R_{44}$ and $R_{45}$ to latch 202 and to OR gate 203 which outputs a signal to the memory address and enable circuit to reset the memory to address "0". The output of latch 202 is applied at point 96 through OR gate 214 to the memory cycle rate control (FIG. 3) to cycle the memory at the high rate of 5500 Hz. The same signal is also applied to switch 100 (FIG. 1) to pass the message from the input (microphone) to the memory. A capacitor $C_{21}$ eliminates bouncing effects of switch 201. When the cycle is completed (and the message is stored in memory), an "end of cycle" signal from the memory address and enable circuit is received through diode $D_5$ and connection 97 at the reset terminals of latches 207 and 202. The output of latch 202 goes to logic "0" and applies a logic "1" to latch 207 through inverters 204, 205 and 206, and the network $R_{46}$, $R_{47}$, $C_{22}$ and $D_6$ which assures that the logic "1" applied to latch 207 is only momentary. The same signal is also applied to OR gate 203 which outputs a logic "1" to the memory reset/start terminal 98. The output of latch 207 also applies a logic "1" to the R/W input of the memory through OR gate 215 and terminal 200 which causes the message to be read out of the memory and be transmitted. The message is read out at a low rate (550 Hz) as a logic "0" is applied to the rate control circuit (FIG. 3).

To receive an incoming signal, switch 208 is momentarily closed. The functioning is analogous to that in the transmitting mode with components 202, 204 through 207, $R_{44}$, $R_{45}$, $R_{46}$, $R_{47}$, $C_{21}$ and $C_{22}$ being replaced with components 208 through 211, $R_{48}$, $R_{49}$, $R_{50}$, $R_{51}$, $C_{23}$, $C_{24}$ and $D_7$. The command signal is also transmitted through OR gate 212. Since in this mode initially no signal is applied to OR gate 214 it outputs a logic "0" causing the memory to be cycled at a low rate. The output from latch 209 closes switch 101 (FIG. 1) through connection 68 to access the incoming signal to memory. After the message has been entered into memory, a "cycle complete" signal is sent from the memory address and enable circuit (FIG. 4) to latches 209 and 211. This causes a logic "1" from latch 211 to be applied to OR gate 214 which causes the memory to be cycled at a high rate. The same signal is also applied to gate 215 giving a READ COMMAND to the memory.

In a similar fashion when switch 213 is momemtarily closed a signal is applied to OR gates 214 and 215 which causes the message stored in memory to be read out and monitored.

Components $R_{52}$ through $R_{56}$, $C_{26}$, $C_{27}$, $D_8$ and latch 220 are employed when the system is first turned on. Five volts are applied through capacitor $C_{26}$ resistors $R_{54}$, $R_{55}$ and $R_{56}$, inverters 218 and 219 and capacitor $C_{27}$ to latch 220. This signal is removed as soon as capacitor $C_{26}$ is charged up. The output from latch 220 is applied through OR gate 216 to the memory cycle rate control (FIG. 3) through terminal 95 which cycles the memory very quickly after which a "cycle complete" signal is sent from the memory address and enable circuit (FIG. 6) through diode $D_5$ to the reset terminals of latches 202, 207, 220, 209, and 211. This assures that the system is ready to be used quickly after it is turned on.

In a similar fashion, when switch 222 is closed momentarily, in conjunction with resistor $R_{57}$ a signal is applied to OR gate 216 which causes the memory to cycle quickly and be ready for a new message.

Figure 11:
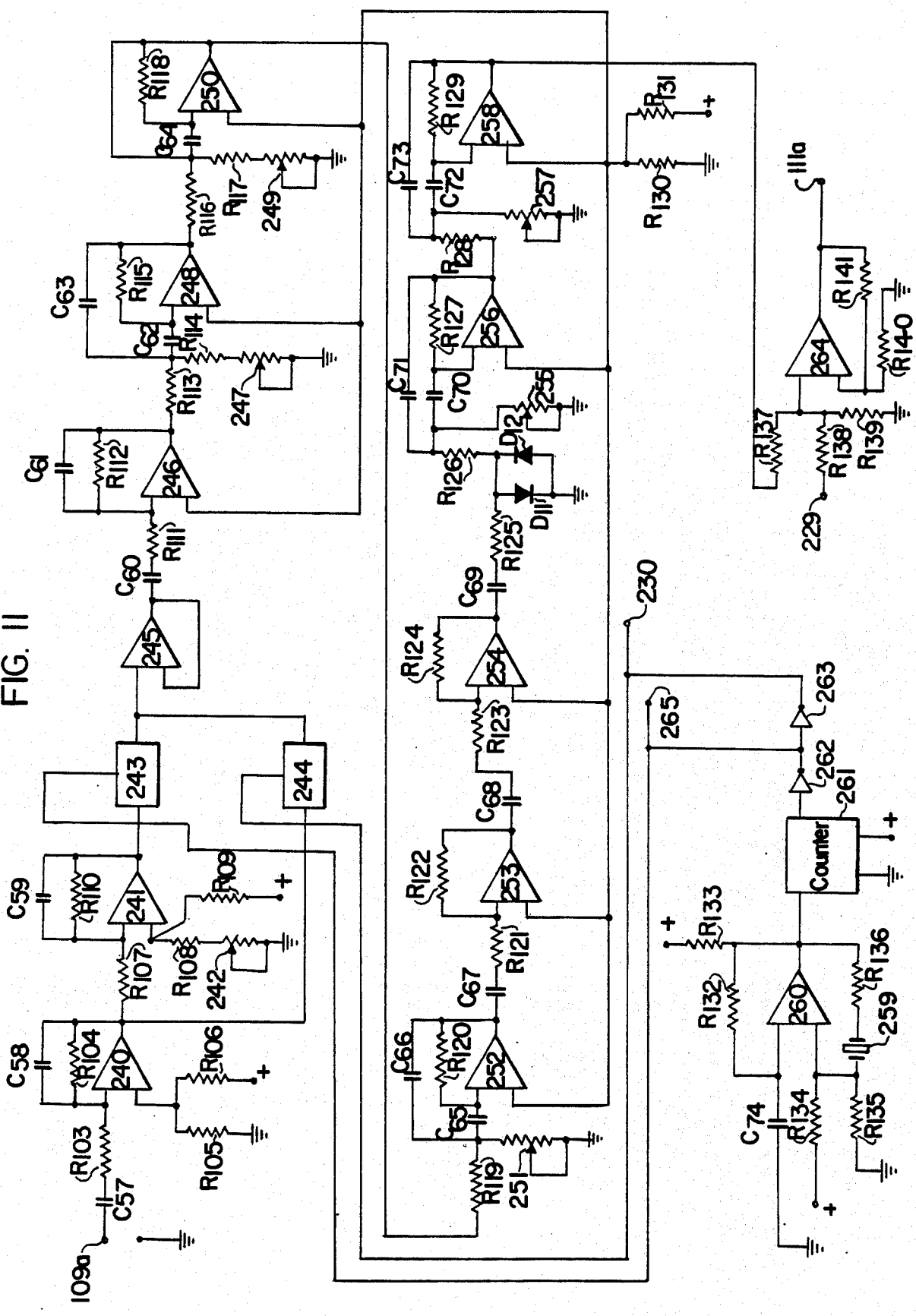
FIG. 11 is a circuit diagram of a modulator which can be used with the first preferred embodiment of the invention.

When the system is ready to transmit a recorded message the output from latch 207 is applied through NAND gates 223 and 224 to power amplifier receptacle 225 which can be used to activate a power amplifier. The same signal from latch 207 is also applied to gates 226, 227 and 228 which allows a synchronizing signal to be transmitted when a second command signal is applied to NAND 226 through terminal 301. The synchronizing signal is of the carrier frequency applied to NAND 228 at terminal 230 from the modulator (FIG. 11).

Figure 9:
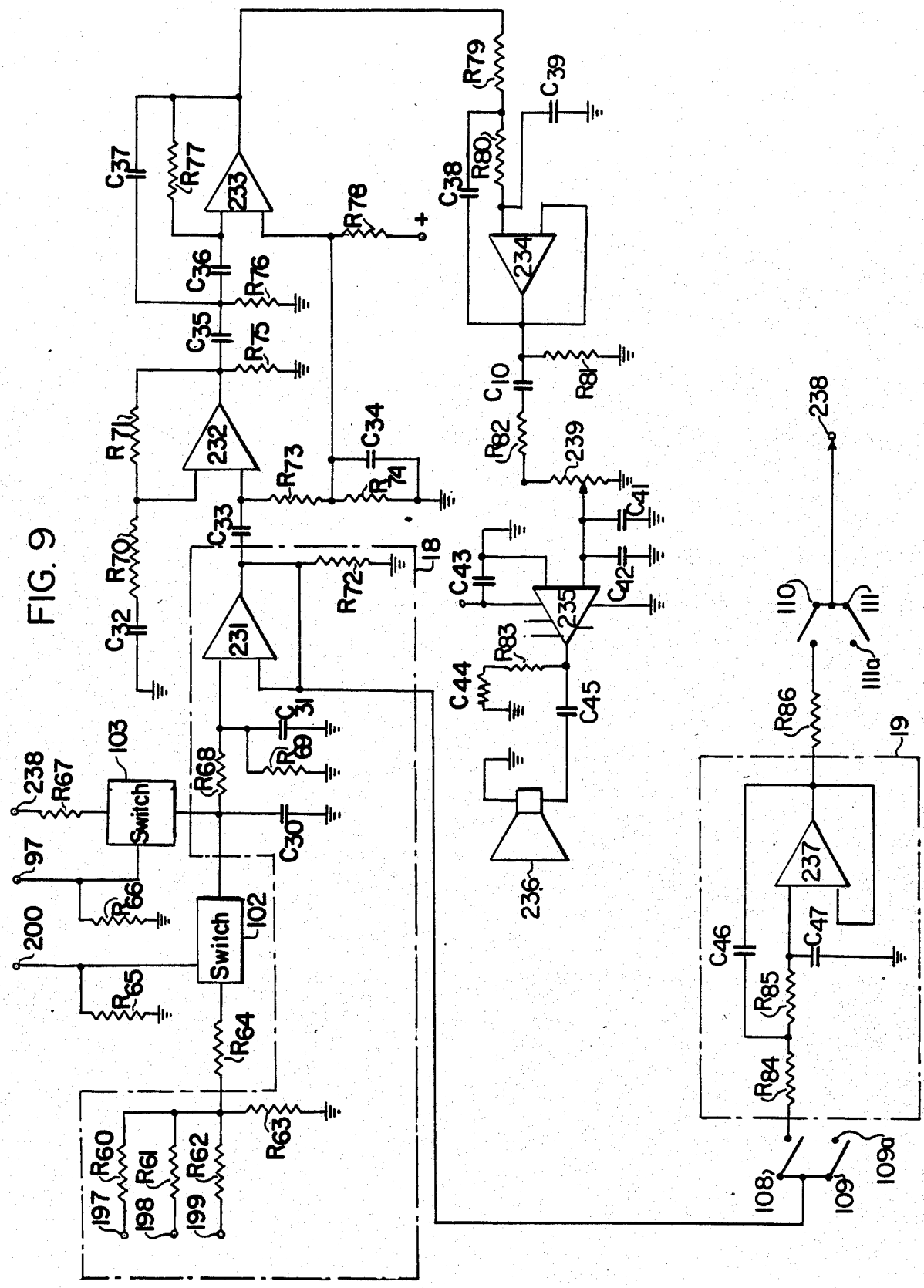
FIG. 9 is a circuit diagram for the digital-analog converter, speaker amplifier and filter.

Signals enter the digital-analog converter circuit seen in FIG. 9 from the memory and through points 197, 198 and 199 and switch 102 (shown as contained in the converter unit 18). The digital signal coming from the memory (FIG. 7) is converted to an analog signal in a well known digital-analog converter consisting of weighing resistors $R_{60}$, $R_{61}$ and $R_{62}$ and amplifier 231 and the peripheral coupling and filter components $R_{63}$, $R_{64}$, $R_{68}$, $R_{69}$, $R_{72}$, $C_{30}$, and $C_{31}$. Switch 102 with associated resistor $R_{65}$ is closed when a signal is read out of memory as determined by the control circuit (FIG. 8). In the standby mode switch 103, with associated resistor $R_{66}$, is closed and switch 102 is opened. The incoming signal enters through resistor $R_{67}$ and switch 103 to amplifier 231. The signal from amplifier 21 is further amplified by amplifier 232 and the associated circuitry composed of components $R_{70}$, $R_{71}$, $R_{75}$, $C_{32}$ and $C_{33}$. The signal is band-pass filtered (preferably to the 200 Hz–3000 Hz range) by amplifiers 233 and 234 and the associated circuitry. The signal is then amplified by the power amplifier 235 and associated components $R_{83}$, $C_{43}$ and $C_{44}$ and coupled to speaker 236 through capacitor $C_{45}$.

The output signal from amplifier 231 is also applied for transmission to the antenna or the power amplifier through switches 108 and 109. In the baseband mode switches 108 and 110 are closed and switches 109 and 111 are opened, (and the modulator and demodulator are not connected), the signal is filtered before transmission by operational amplifier 237 and the associated circuitry containing components $R_{84}$, $R_{85}$, $R_{86}$, $C_{46}$ and $C_{47}$. In the single side band mode (modulator and demodulator present) switches 109 and 111 are closed and switches 108 and 110 are opened, and the signal passes through the modulator (FIG. 9) before transmission. Components $R_{73}$, $R_{74}$, $R_{77}$ and $C_{34}$ bias amplifiers 232 and 233.

In the receiver limiter amplifier unit diagramed in FIG. 10 the incoming signal is applied to the voltage divider consisting of $R_{90}$, $R_{91}$ and potentiometer 240. It is filtered and amplified by amplifiers 241, 242 and 243, and peripheral potentiometer 244, resistors and capacitors. The signal's amplitude is limited by diodes $D_9$ and $D_{10}$ in conjunction with amplifier 242. The three amplifier stages are biased by the metwork consisting of components $R_{95}$, $R_{96}$ and $C_{52}$.

I can provide a modulator and sychronizer to shift the signal frequency to a frequency band with a good signal-to-noise ratio in a mine environment, to transmit a single-side-band signal thereby maximizing energy utilization and to transmit a synchronizing signal prior to message transmission in order to ready the receiver to accept the incoming signal. As illustrated in FIG. 1 a modulator and coder unit 72 is provided for the transmitter mode. Correspondingly, a demodulator and decoder unit 70 is provided for the receiver mode.

The "coder" and "decoder" such as associated with components 70 and 72 consist of components associated with sending a single frequency synchronizing signal from the transmitter to the receiver prior to sending the message. The receiver recognizes said signal and activates the memory in the receiver to accept the message.

This is accomplished as follows: The "coder" is not a separate device, but a combination of parts of the modulator (FIG. 11) and control circuit (FIG. 8). To send said synchronizing (or single frequency code) signal, switch 201 (FIG. 8) is closed momentarily causing an output voltage from latch 207 which is sent through gates 226 and 227 to gate 228. A second command signal is applied to NAND 226 through terminal 301. This enables the transmission of the synchronizing signal to occur. The synchronizing signal comes from the modulator (FIG. 11) terminal 230 and is applied to terminal 230 of gate 228 (FIG. 8).

At the receiver, said single frequency synchronizing signal ("start receive" code) is recognized (decoded) in response to which the receiver memory is activated. This is accomplished as follows: The incoming synchronizing signal is taken off resistor R154 (FIG. 12), filtered and amplified by operational amplifier 276 and 277 and associated circuitry containing components R155 through R161, C88, D13 and potentiometer 284, and is applied to the control circuit (FIG. 8) through terminal 300.

My coder is an integral part of the modulator and the decoder is an integral part of the demodulator and the operation is described infra.

These are known techniques.

Except for the modulator and synchronizer units this embodiment of the invention operates in the same manner as the first preferred embodiment. In the transmitter mode the signal from the digital-analog converter is fed into the modulator and coder unit 72. There the frequency of the signal is shifted to a frequency with a good signal-to-noise ratio in a mine environment. I have found that frequencies in the 1100–1250 Hz range provide such a ratio. The unit as discussed also generatess single frequency (code) a synchronizer signal, provides a carrier voltage and converts spoken or the like signal to a single-side-band signal for transmission. At the receiving mode the demodulator and synchronizing ("start receive") decoder unit 70 returns the original spoken signal or the like to its original frequency.

Figure 12:
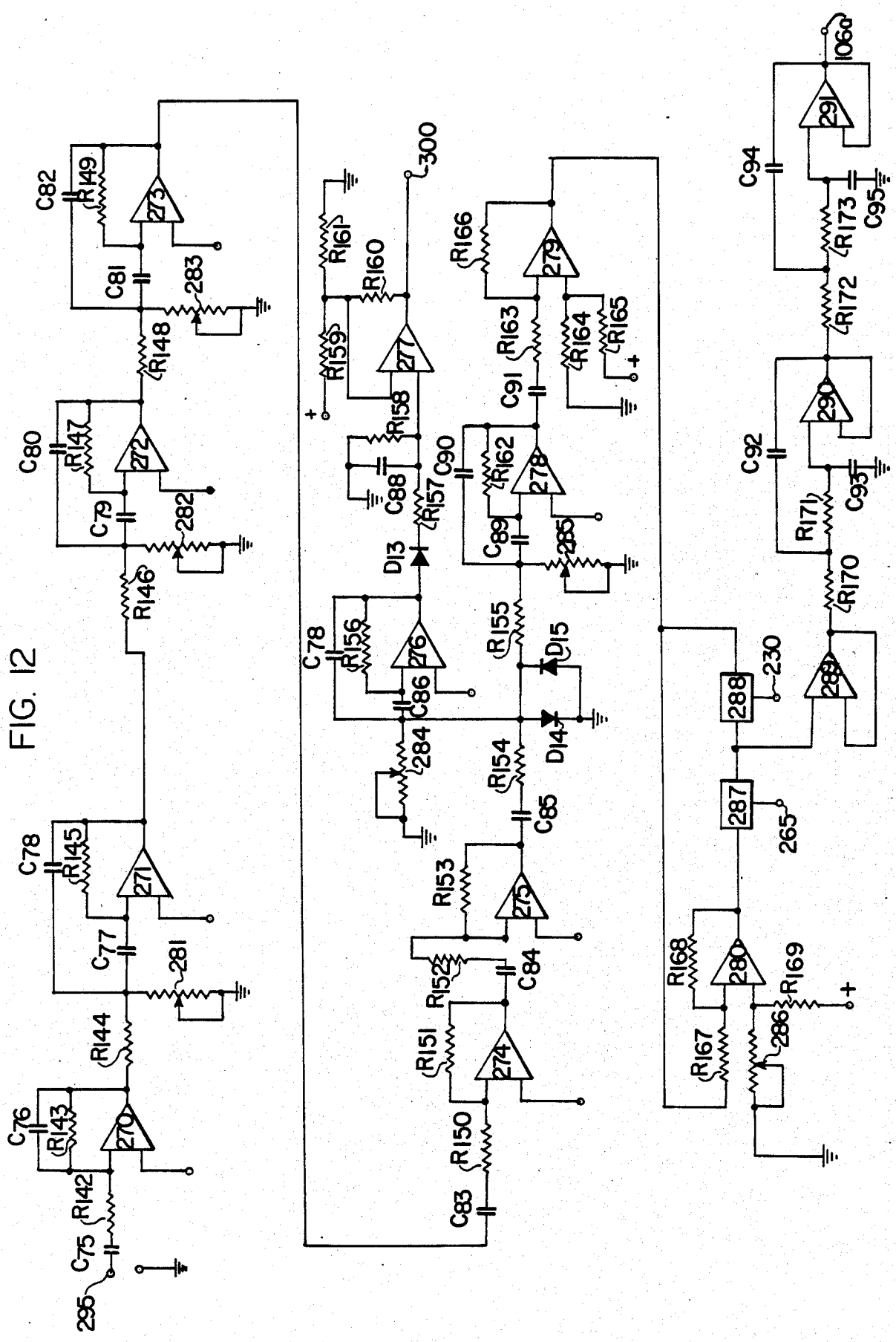
FIG. 12 is a circuit diagram of a demodulator unit that can be used with the first preferred embodiment of the invention.

FIGS. 11 and 12 respectively show the present preferred circuitry for my modulator and demodulator units.

FIG. 11 is a diagram of the present preferred embodiment of my modulator. The signal to be transmitted is applied from the digital analog converter (FIG. 8) to the filter consisting of operational amplifier 240 associated components $R_{103}$, $R_{104}$, $C_{57}$, $C_{58}$ and associated bias resistors $R_{105}$ and $R_{106}$. The signal is fed to the next stage operational amplifier 241 and associated potentiometer 242 capacitor $C_{59}$ and resistors $R_{107}$ thru $R_{110}$. The signal from amplifier 240 is also fed to switch 244, and the signal from amplifier 241 is fed to switch 243. Switches 243 and 244 are actuated alternatively with signals from inverters 262 and 263, respectively. These signals are generated by the oscillator composed of operational amplifier 260, crystal 259, capacitor $C_{74}$ and resistors $R_{132}$ thru $R_{136}$. The oscillator signal frequency is divided by a factor of 16 by counter 261. The output of counter 261 which is at the carrier frequency of the modulator is applied to inverters 262 and 263. The amplitude modulated signal is buffered by voltage follower 245 and is filtered by a series of filters consisting of components 246 thru 258 with associated resistors $R_{111}$ thru $R_{129}$, capacitors $C_{61}$ thru $C_{73}$ and diodes $D_{11}$ and $D_{12}$ so that only the upper sideband of the modulated signal appears at the output of operational amplifier 258. Resistors $R_{130}$ and $R_{132}$ bias operational amplifiers 246, 248, 250, 253, 254, 256 and 258. The output from amplifier 258 is amplified by operational amplifier 264 with associated resistors $R_{137}$ thru $R_{140}$ and the output of that amplifier 264 is applied to the antenna or power amplifier (FIG. 10) through terminal 110a. Operational amplifier 264 also has an input through terminal 229 resistor $R_{138}$ for the synchronizing signal activated by the control circuit (FIG. 8). The high frequency synchronization signal is applied from inverter 263 through terminal 230 to the control circuit (FIG. 8).

The present preferred circuit for the optional demodulator unit is shown in FIG. 12. The incoming signal is received from the antenna (or preamplifier) through terminal 295. The signal is amplified and filtered through operational amplifiers 270 thru 280 and associated potentiometers 281 thru 285, resistors $R_{142}$ thru $R_{169}$, capacitors $C_{75}$ thru $C_{91}$ and diodes $D_{13}$ thru $D_{15}$. The signals from the outputs of operational amplifiers 279 and 280 are switched alternatively through switches 287 and 288 respectively. The switching rate is obtained from the oscillator of the modulator (FIG. 11) through terminals 265 and 230. The oscillator is of the same frequency as the oscillator of the transmitter. The output from switch 287 and 289 is buffered by voltage follower 289. This signal containing the sum and the difference of the upper side band carrier signals. Filters composed of operational amplifiers 290 and 291 and the associated components $R_{170}$ thru $R_{174}$ and $C_{92}$ thru $C_{94}$ pass only the difference which is the original message signal, which is now applied for processing through terminal 106a. The incoming synchronizing signal is taken off resistor $R_{154}$, filtered and amplified by operational amplifiers 276 and 277 with associated circuitry containing components $R_{155}$ thru $R_{161}$, $C_{86}$ thru $C_{88}$, $D_{13}$ and potentiometer 284, and is applied to the control circuit through terminal 300 to activate the receiver memory and digital processing. Operational amplifiers 270 thru 276 and 278 are biased at approximately half the supply voltage.

DESCRIPTION OF A SECOND PREFERRED EMBODIMENT

Figure 13:
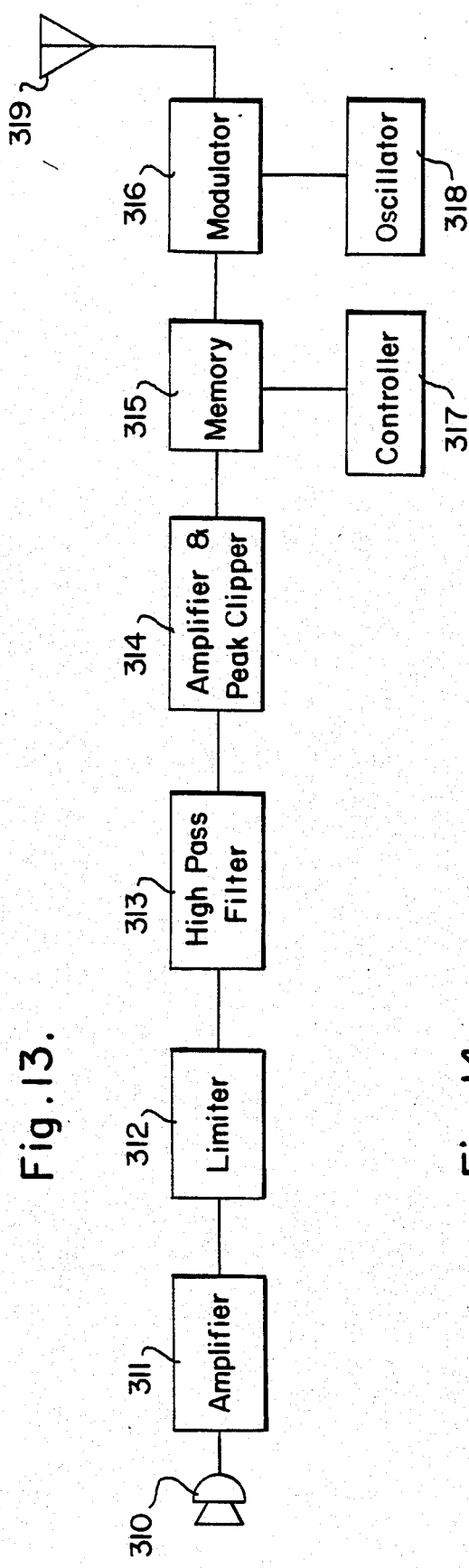
FIG. 13 is a block diagram of the transmitter in a second preferred embodiment of the invention.
Figure 15:
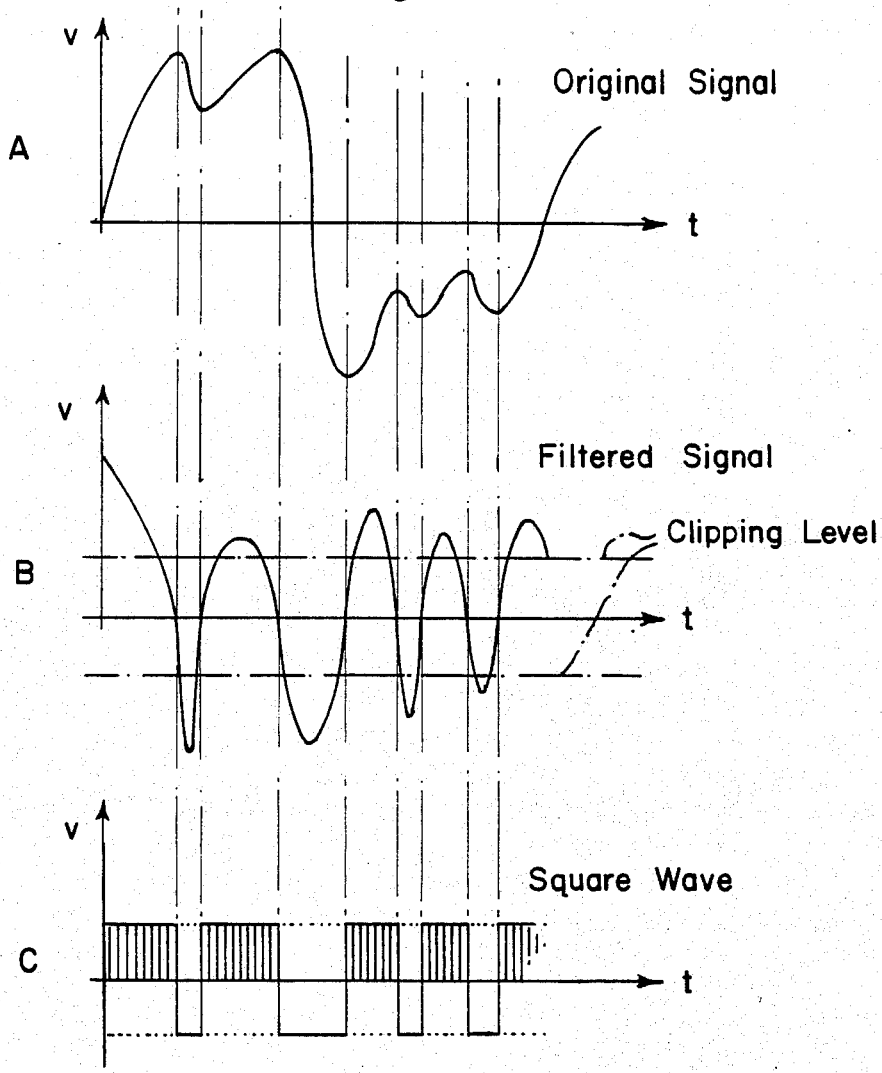
FIG. 15 is a diagram showing the transformation of the original signal to a square wave which is performed by the transmitter of FIG. 13.

Referring to FIG. 13, I provide a microphone 310 or other signal input means connected to an amplifier 311 and signal limiter 312 which removes environmental noise and produces a signal having a desired amplitude. The signal is then fed into a high pass filter 313 which differentiates the signal. Graphs A and B of FIG. 15 illustrate how the signal is changed by the high pass filter. The high pass filter is connected to an amplifier and signal peak clipper unit 314 which transforms the signal to a square wave as illustrated by graph C of FIG. 15. The peaks and valleys of the original signal correspond to zero crossings in the filtered signal and in the square wave as shown by the chain lines between the graphs.

The square wave is directed into a memory 315 where the occurrence of zero crossings is recognized and stored. The storage can be done by sampling the wave and recording a "1" or a "0" depending upon whether the wave is positive or negative or one could record the intervals between zero crossings. Alternatively one can use a zero crossing detector and record the points in time at which zero crossings occur.

Figure 16:
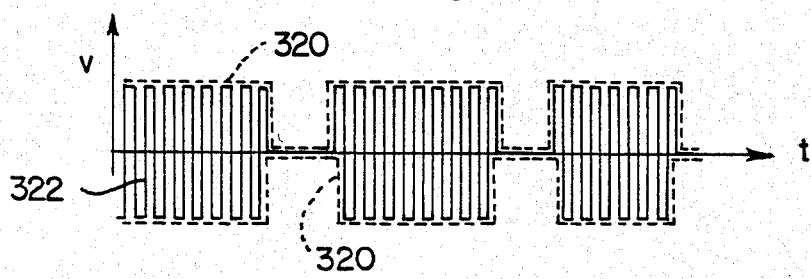
FIG. 16 is a graph of the carrier frequency as modulated by the zero crossings in the square wave as read from the memory.

Controller 317 causes the signal which has been stored in a memory 316 to be read from the memory at a rate slower than the rate used to input the signal into the memory. The output from the memory 315 is fed into modulator 316. This output determines how a carrier signal generated by oscillator 318 will be modulated. The carrier frequency is passed through the modulator until the signal from memory 316 indicates that a zero crossing has been encountered. At that point the modulator will not allow passage of the carrier frequency through the modulator until the next zero crossing is encountered. Thereafter, the signal will be transmitted until another zero crossing occurs. This pattern will continue until the contents of the memory have been read. FIG. 16 illustrates the type of signal which may be emitted from the modulator. An envelope 320 can be drawn about the carrier frequency 322. This envelope corresponds to the square wave of FIG. 15 with larger time intervals between zero crossings. The increase in time intervals is caused by reading from the memory at a rate slower than was used to enter the signal into the memory. Antenna 319 is used to transmit the carrier signal. Preferably only one sideband is transmitted.

Figure 14:
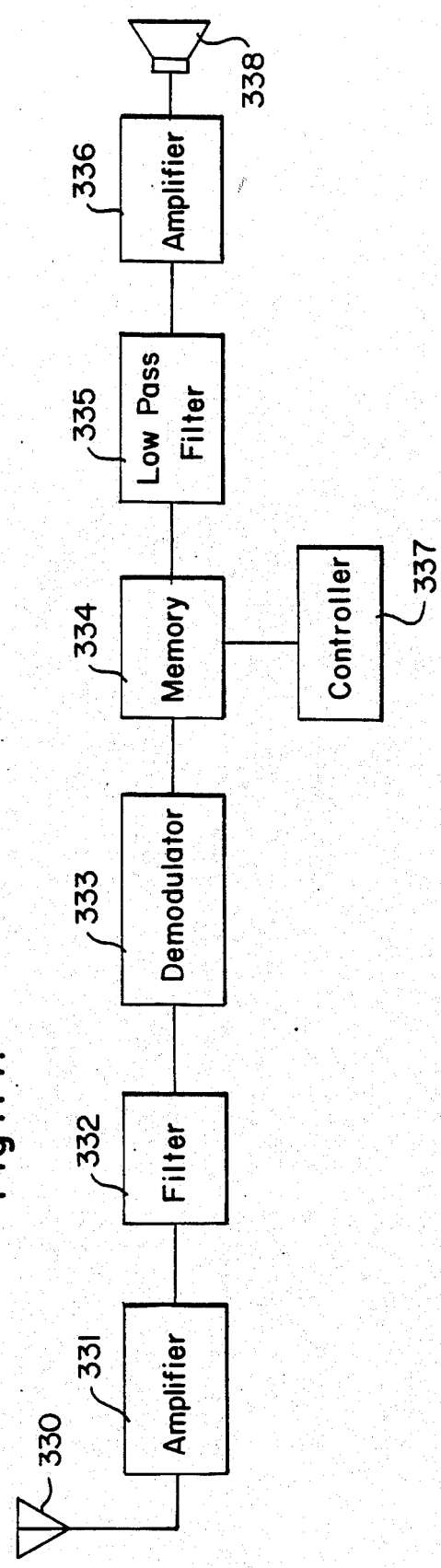
FIG. 14 is a block diagram of the receiver in a second preferred embodiment of the invention.

The receiver is shown in FIG. 14. Antenna 330 receives the signal which is then amplified and filtered by amplifier 331 and filter 332 to remove environmental noise. Next the signal is demodulated by demodulator 333 and read into memory 334. Then the signal is read out to a low pass filter 335 at the same rate at which it was recorded in the transmitter. The low pass filter integrates the signal to produce the original signal that was fed into the transmitter. Then the signal can be amplified by amplifier 336 applied to a speaker 338 or other output. A controller 337 sets the rate at which the signal is read out of the memory.

In the second preferred embodiment I utilized a high pass filter and amplifier and peak clipper to identify the peaks and valleys in the original signal. One may utilize other apparatus such as a peak detector to identify the changes in shape in the original signal.

Although I prefer to use a carrier signal one may choose to transmit the signal, or one of the sidebands of the signal, which is read from the memory.

As can be seen by comparing FIGS. 13 and 14 to FIG. 1, the high pass filter, amplifier and peak clipper unit, and low pass filter of the second preferred embodiment replace the analog/digital and digital/analog conversion units of the first preferred embodiment. Such a replacement reduces the cost of the transceiver. Nevertheless, the optional synchronizing signal, monitoring speaker 24 and coder/decoder described in connection with the first embodiment can also be used in all other embodiments of the invention.

While I have shown and described certain present preferred embodiments of the invention it is to be distinctly understood that the invention is not limited thereto but may be otherwise variously embodied within the scope of the following claims.

I claim:

1. A method for transmitting and receiving spoken messages and other wide frequency signals from a mine and other environments where environmental factors limit available safely permissible transmission power to the extend that only narrow bandwidth messages may be transmitted comprising the steps of:
    (a) modifying the signal as necessary to remove environmental noise and to obtain a signal having a desired amplitude;
    (b) sampling the signal at a predetermined rate;
    (c) converting the signal to a digital signal;
    (d) storing the digital signal in a signal storage means;
    (e) reading said digital signal from said signal storage means at a rate slower than the predetermined sampling rate to create later a transmitted analog signal having a narrower frequency bandwidth which can be transmitted with the available safely permissible transmission power;
    (f) converting said slowed-digital signal to an analog signal;
    (g) transmitting said analog signal;
    (h) receiving by electromagnetic induction said transmitted analog signal;
    (i) modifying said received analog signal as necessary to remove environmental noise and to obtain a resultant signal having a desired peak amplitude;
    (j) sampling said resultant signal at the same rate used in step e;
    (k) converting said sampled analog signal to a digital signal;
    (l) storing said digital signal in a signal storage means;
    (m) reading said stored digital signal from said signal storage means at the rate used in step b;
    (n) converting said read digital signal to an analog signal; and
    (o) applying said analog signal to a speaker or the like.

2. The method of claim 1 wherein the signal storage means is a random access memory unit.

3. The method of claim 1 also comprising the steps of applying the signal to a speaker while transmitting the signal.

4. The method of claim 1 also comprising the steps of
    (f') transmitting a synchronizing signal prior to transmitting the signal; and
    (g') receiving the synchronizing signal prior to receiving the signal.

5. A transceiver for transmitting and receiving spoken messages and other wide frequency bandwidth signals from a mine and other environments where available safely permissible transmission power is limited comprising:
    (a) a transmitter unit comprised of:
        (i) a signal input means for inputting a signal of a given duration;
        (ii) a first amplifier having an output and an input, said input connected to an output of said signal input means;
        (iii) an amplitude limiter having an output and an input, said input connected to said output of said amplifier;
        (iv) a bandpass filter having an input and an output, said input connected to said output of said amplitude limiter;
        (v) a first level shifter connected to the output of said filter; said shifter having an output;
        (vi) an analog-digital converter having an output and an input, said input connected to the output of said first level shifter; said analog-digital converter: (1) sampling a signal at said input, (2)

quantizing the sampled signal into several levels, and (3) converting the signal levels binary digits;

(vii) a first memory connected to said output of said analog-digital converter, into which the binary digits are inputted and stored;

(viii) a first digital-analog converter having an output and an input, said input of said digital-analog converter connected to an input of said first memory, which reads the binary digits from said memory at a rate slower than the rate the binary digits were inputted into said first memory and then converts the binary digits into an analog signal having a narrower frequency bandwidth which can be transmitted with the available safely permissible power;

(ix) a first signal modifier having an input and an output, said input and said output are selectably connected to one of a low pass filter and a modulator, said input is connected to said output of said digital-analog converter;

(x) a transmitter having an input and an output, which will transmit with the available safely permissible transmission power, said input of said transmitter connected to the output of said first signal modifier, for transmitting a signal; and (b) a receiver unit comprised of:

(i) a signal receiving antenna which receives by electromagnetic induction the transmitted signal;

(ii) a second amplifier having an output and an input, said input connected to said antenna;

(iii) a second signal modifier having an input and an output, said input and said output are selectably connected to one of an amplitude limiter and a demodulator, said input connected to said output of said second amplifier;

(iv) a second level shifter connected to an output of said second signal modifier;

(v) a second analog-digital converter having an output and an input, said input connected to the output of said second level shifter; said analog-digital converter: (1) sampling a level shifted received signal at said input at a rate equal to the rate at which the said transmitter unit's digital-analog converter reads the binary digits from said first memory, (2) quantizing the received level-shifted sampled signal into several levels, and (3) converting said signal levels into binary digits;

(vi) a second memory having an output and an input, said input connected to the output of said analog-digital converter, into which the binary digits are inputted and stored;

(vii) a second digital-analog converter having an input and an output, said input connected to said output of said second memory, said second digital-analog converter: (1) reading the binary digits from said second memory at a rate equal to the rate at which the transmitter unit's analog-digital converter feeds binary digits into the transmitter unit's first memory, and (2) then converting the binary digits in said second memory into an analog signal;

(viii) a third amplifier having an input and an output, said input connected to the output of said second digital-analog converter; and (ix) a signal output means connected to the output of said third amplifier.

6. The transmitter of claim 5 wherein the first signal modifier includes a balanced modulator which modulates the signal on a carrier frequency and suppresses the carrier frequency, and the second signal modifier includes a demodulator which demodulates the signal to its original frequency.

7. The apparatus of claim 5 wherein: the signal input means includes a microphone.

8. The apparatus of claim 5 wherein the band-pass filters have a range of 500 to 2000 Hz.

9. The apparatus of claim 5 also comprising a coder connected to the transmitter and a decoder attached to the receiver.

10. The apparatus of claim 5 also comprising an amplifier and speaker connected to the transmitter.

11. A transceiver for transmitting and receiving spoken messages and other wide frequency bandwidth signals from a mine and other environments where available safely permissible transmission power is limited comprising:

(a) a transmitter unit comprised of:

(i) a signal input means for inputting a signal of a given duration;

(ii) a first amplifier having an output and an input, said input connected to an output of said signal input means;

(iii) an amplitude limiter having an output and an input, said input connected to said output of said amplifier;

(iv) a bandpass filter having an input and an output, said input connected to said output of said amplitude limiter;

(v) a first level shifter connected to the output of said filter;

(vi) an analog-digital converter having an output and an input, said input connected to the output of said first level shifter; said analog-digital converter: (1) sampling a signal at said input, (2) quantizing the sampled signal into several levels, and (3) converting the signal into binary digits;

(vii) a first memory connected to said output of said analog-digital converter, into which the binary digits are inputted and stored; said output of said second amplifier; said demodulator demodulates the signal to an original frequency of the signal at the input of said signal input means;

(iv) a second level shifter connected to an output of said second signal modifier;

(v) a second analog-digital converter having an output and an input, said input connected to the output of said second level shifter; said analog-digital converter: (1) sampling a level shifted received signal at said input at a rate equal to the rate at which said transmitter unit's digital-analog converter reads the binary digits from said first memory, (2) quantizing the received level-shifted signal into several levels, and (3) converting said signal levels into binary digits;

(vi) a second memory having an output and an input, said input connected to the output of said analog-digital converter, into which the binary digits are inputted and stored;

(vii) a second digital-analog converter having an input and an output, said input connected to said output of said second memory, said second digital-analog converter: (1) reading the binary digits from said second memory at a rate equal to the rate at which the transmitter unit's analog-digital converter feeds binary digits into the transmitter unit's first memory, and (2) then converting the binary digits in said second memory into an analog signal;
(viii) a first digital-analog converter having an output and an input, said input of said digital-analog converter connected to an output of said first memory, which reads the binary digits from said memory at a rate slower than the rate the binary digits were inputted into said first memory and then converts the binary digits into an analog signal having a narrower frequency bandwidth which can be transmitted with the available safely permissible power;
(ix) a first signal modifier which is selectably connected to one of a low pass filter and a modulator, to connect to said output of said digital-analog converter; said modulator being a balanced modulator which modulates the analog signal at the output of said first digital-analog converter onto a carrier frequency and suppresses the carrier frequency;
(x) a transmitter having an input and an output, which will transmit with the available safely permissible transmission power, said input of said transmitter connected to the output of said first signal modifier, for transmitting a signal; and
(b) a receiver unit comprised of:
(i) a signal receiving antenna which receives by electromagnetic induction the transmitted signal;
(ii) a second amplifier having an output and an input, said input connected to said antenna;
(iii) a second signal modifier having an input and an output, said input and said output are selectably connected to one of an amplitude limiter and a demodulator, said input connected to
(viii) a third amplifier having an input and an output said input connected to the output of said second digital-analog converter; and
(ix) a signal input means connected to the output of said third amplifier.

12. A transceiver for transmitting and receiving spoken messages and other wide frequency bandwidth signals from a mine and other environments where available safely permissible transmission power is limited comprising:
(a) a common transceiver module having an input and an output, said module comprising:
(i) a level shifter having an input and an output, said input being said input of said common transceiver module;
(ii) an analog-digital converter having an input and an output, said input connected to the output of said level shifter; said analog-digital converter:
(1) sampling a signal at said input, (2) quantizing the sampled signal into several levels, and (3) converting the signal into binary digits;
(iii) a memory connected to said output of said analog-digital converter, into which the binary digits are inputted and stored; and
(iv) a digital-analog converter having an input and an output, said input of said digital-analog converter connected to an output of said memory, which (1) reads the binary digits from said memory at a predetermined rate which is different than the rate the binary digits were inputted into said memory, and (2) then converts the binary digits into an analog signal; said output of said digital-analog converter being said output of said common transceiver module;
(b) a transmitter-specific unit comprising:
(i) a signal input means for inputting a signal of a given duration;
(ii) a first amplifier having an input and an output, said input connected to said output of said signal input means;
(iii) an amplitude limiter having an input and an output, said input connected to said output of said first amplifier;
(iv) a bandpass filter having an output and an input, said input connected to said output of said amplitude limiter; said output of said bandpass filter being first-suitably connected to said input of said common transceiver module;
(v) a first signal modifier having an input and an output, said modifier selectably connected to one of a low pass filter and a modulator; said input being first-suitably connected to said output of said common transceiver module;
(vi) a transmitter having an input and an output, which will transmit with the available safely permissible transmission power, said input of said transmitter connected to the output of said first signal modifier, for transmitting a signal;
wherein:
(I) said first-suitable connections are made only when and during said transceiver is transmitting, and
(II) said predetermined rate of said digital-analog converter of said common transceiver module is slower than the rate at which said binary digits are inputted into said memory during the time when said first-suitable connections are made, said predetermined rate being such that said analog signal from said output of said common transceiver module has a narrower bandwidth which can be transmitted with the available safely permissible power; and
(c) a receiver-specific unit comprising:
(i) a signal receiving antenna which receives by electromagnetic induction the transmitted signal;
(ii) a second amplifier having an input and an output, said input connected to said antenna;
(iii) a second signal modifier having an output and an input, said input and said output are selectably connected to one of an amplitude limiter and a demodulator, said input connected to said output of said second amplifier; said output of said second signal modifier being second-suitably connected to said input of said common transceiver module;
(iv) a third amplifier having an input and an output, said input being second-suitably connected to said output of said common transceiver module; and
(v) a signal output means connected to said output of said third amplifier;
wherein:
(I) said second-suitable connections are made only and during when said transceiver is receiving, and
(II) said predetermined rate of said digital-analog converter of said common transceiver module is faster than the rate at which said binary digits are inputted into said memory during the time when said second suitable connections are made.

13. A method for transmitting and receiving spoken messages and other wide frequency signals from a mine and other environments where enviromental factors limit available safely permissible transmission power to the extent that only narrow bandwidth messages may be transmitted comprising the steps of:

(a) modifying said wide frequency signal as necessary to remove environmental noise and to obtain a signal having a desired peak amplitude;
(b) identifying peaks and valleys in said signal;
(c) sequential addressing of a memory at a chosen rate and recording the occurrence of each peak and valley occurrence over time at the associated location in memory;
(d) producing a second signal derived by reading from said memory including each peak and valley occurrence, said reading performed at a rate slower than the peak and valley occurrences were recorded;
(e) transmitting at least said second signal read from said memory;
(f) receiving by electromagnetic induction said transmitted signal;
(g) modifying said received signal as necessary to remove environmental noise and to obtain a third signal having a desired peak amplitude;
(h) storing said third signal in a second memory;
(i) reading said third signal from said second memory at the rate of step (c);
(j) applying said read signal to a low pass filter to integrate said read signal thereby transforming said signal to a signal similar in form to said spoken message or wide frequency original shape: and
(k) applying said filtered signal to a speaker or the like.

14. The method of claim 13 wherein in step (b) a peak detector is used to identify peak and valley occurrences.

15. The method of claim 13 wherein in step (b) the peak and valley occurrences are identified by passing the signal through a low pass filter and then through an amplifier and peak clipper.

16. The method of claim 13 also comprising within step (e) the simultaneous step of applying the signal to a speaker while transmitting the signal.

17. The method of claim 13 also comprising after step (d) and prior to step (e), the step of transmitting a synchronizing signal.

18. A transceiver for transmitting and receiving spoken messages and other wide frequency bandwidth signals from a mine and other environments where available safely permissible transmission power is limited comprising:

(a) a transmitter unit comprised of:
(i) a signal input means, having an output, for inputting a signal of a given duration;
(ii) an amplifier, having an input and an output, said input connected to said output of said signal input means;
(iii) an amplitude limiter having an input and an output, said input connected to said output of said amplifier;
(iv) means for identifying times of peak and valley occurrences in the signal outputted from said amplitude limiter and producing an identifying signal; said identifying means having an input and an output; said input of said means connected to said output of said amplitude limiter;
(v) transmitter memory having an input and an output, said input connected to said output of said identifying means;
(vi) controller connected to said transmitter memory which enables the identifying signal at said output of said identifying means to be written into said transmitter memory at one rate and read from said transmitter memory at a slower rate;
(viii) a transmitter which will transmit with the available safely permissible transmission power, said transmitter connected to said transmitter memory for transmitting with modulation by said slower rate signal read from said memory; and (b) a receiver unit comprised of:
(i) a signal receiving antenna which receives by electromagnetic induction said transmitted signal;
(ii) an amplifier connected to said antenna;
(iii) a filter having an output, connected to said amplifier for reducing environmental noise;
(iv) a demodulator having an output and an input, said input connected to said output of said filter;
(v) a receiver memory connected to said output of said demodulator, within which a demodulated signal at said output of said demodulator is stored;
(vi) a controller connected to said memory which causes said signal stored in said receiver memory to be read from said memory at a rate equal to the rate at which said identifying signal at said output of said transmitter's identifying means was written into said transmitter memory;
(vii) a low pass filter connected to said receiver memory;
(viii) an amplifier connected to said low pass filter; and
(ix) a speaker or the like connected to said amplifier.

19. The apparatus of claim 18 wherein the means for identifying peak and valley occurrences is a peak detector.

20. The apparatus of claim 18 wherein the means for identifying peak and valley occurrences is a high pass filter connected to an amplifier and peak clipper unit.

21. The apparatus of claim 18 wherein:
(a) the signal input means include a microphone.

22. The apparatus of claim 18 also comprising an amplifier-and-speaker connected to the transmitter.

23. The apparatus of claim 18 also comprising:
(a) a coder connected to the transmitter unit which transmits a synchronizing signal prior to transmitting said slower rate signal read from said transmitter memory and,
(b) a decoder connected to said output of said filter of the receiver which receives said synchronizing signal and permits receiver memory to be accessed.

24. A method for transmitting and receiving spoken messages and other wide frequency signals from a mine and other environments where environmental factors limit available safely permissible transmission power to the extent that only narrow bandwidth messages may be transmitted comprising the steps of:

(a) modifying said wide frequency signal as necessary to remove environmental noise and to obtain a signal having a desired peak amplitude;
(b) identifying peaks and valleys in said signal thus producing an identification signal;

(c) producing a second signal derived from said identification signal wherein said second signal is of a first polarity during the times from the occurrences of each valley to each peak and said second signal is not of that first polarity otherwise;
(d) recording into a first memory said second signal at a chosen sampling rate and reading from said first memory at a rate slower than said chosen sampling rate;
(e) transmitting at least said second signal read from said memory;
(f) receiving by electromagnetic induction said transmitted signal;
(g) modifying said received signal as necessary to remove environmental noise and to obtain a third signal having a desired peak amplitude;
(h) storing said third signal in a second memory;
(i) reading said second memory at the recording rate of step (d);
(j) applying said read signal to a low pass filter to integrate said read signal thereby transforming said signal to a signal similar in form to said spoken message or wide frequency original signal; and
(k) applying said filtered signal to a speaker or the like.

* * * * *